(12) United States Patent
Murao et al.

(10) Patent No.: US 11,310,215 B2
(45) Date of Patent: Apr. 19, 2022

(54) ACCESS MANAGEMENT OF PUBLISHER NODES FOR SECURE ACCESS TO MAAS NETWORK

(71) Applicant: SONY CORPORATION, Tokyo (JP)

(72) Inventors: Sadayoshi Murao, Bangalore (IN); Madhvesh Sulibhavi, Bangalore (IN); Srinivasa Pingili, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/916,070

(22) Filed: Jun. 29, 2020

(65) Prior Publication Data
US 2021/0409393 A1    Dec. 30, 2021

(51) Int. Cl.
| | |
|---|---|
| *G06Q 40/00* | (2012.01) |
| *H04L 29/06* | (2006.01) |
| *H04W 12/06* | (2021.01) |
| *H04L 67/56* | (2022.01) |
| *G06Q 20/40* | (2012.01) |

(Continued)

(52) U.S. Cl.
CPC ......... *H04L 63/0807* (2013.01); *G06Q 20/10* (2013.01); *G06Q 20/401* (2013.01);
(Continued)

(58) Field of Classification Search
USPC .................. 705/39, 37, 36, 38, 64; 719/328; 717/108; 709/226; 715/704, 753; 726/9;
(Continued)

(56) References Cited

U.S. PATENT DOCUMENTS

| | | | | |
|---|---|---|---|---|
| 9,954,839 B2 * | 4/2018 | Ahmed | ............... | H04L 63/0807 |
| 2011/0138454 A1 * | 6/2011 | Mansour | ............. | H04L 63/0861 |
| | | | | 726/9 |

(Continued)

FOREIGN PATENT DOCUMENTS

| | | |
|---|---|---|
| CN | 110300190 A | 10/2019 |
| WO | WO-2019135830 A1 | 7/2019 |

OTHER PUBLICATIONS

A Case for Machine Learning in Edge-Oriented Computing to Enhance Mobility as a Service; 2019 15th International Conference on Distributed Computing in Sensor Systems (DCOSS) (pp. 530-537); Goncalo Carvalho, Bruno Cabral, Vasco Pereira, Jorge Bernardino; May 29, 2019. (Year: 2019).*

(Continued)

*Primary Examiner* — Tien G Nguyen
(74) *Attorney, Agent, or Firm* — Chip Law Group

(57) ABSTRACT

A system including a server and a first publisher node device is provided. The first publisher node device transmits a request including an authentication credential associated with the first publisher node device to the server and receives a response including authentication of the first publisher node device as a ticket processing client for a first transportation service. The first publisher node device captures, as the ticket processing client, an event associated with the first transportation service based on the received response and transmits, based on the captured event, a transaction request to a broker node device. The transaction request includes a transaction message and an authorization request to route the transaction message to a first subscriber node device of the MaaS network. The server receives the authorization request from the broker node device and authorizes the broker node device to route the transaction message based on the received authorization request.

18 Claims, 9 Drawing Sheets

(51) Int. Cl.
 *G06Q 30/02* (2012.01)
 *G06Q 20/10* (2012.01)
(52) U.S. Cl.
 CPC .............. *G06Q 30/02* (2013.01); *H04L 67/28* (2013.01); *H04W 12/06* (2013.01)
(58) Field of Classification Search
 USPC ........................................................ 700/245
 See application file for complete search history.

(56) References Cited

U.S. PATENT DOCUMENTS

2017/0006034 A1* 1/2017 Link, II .............. H04L 61/2514
2019/0005534 A1* 1/2019 Cummings ........ G06Q 30/0243

OTHER PUBLICATIONS

"Client, Broker / Server and Connection Establishment", MQTT Essentials, Part 3, HiveMQ Team, Jul. 17, 2019, 16 pages.

* cited by examiner ically ACCESS MANAGEMENT OF PUBLISHER NODES FOR SECURE ACCESS TO MAAS NETWORK

CROSS-REFERENCE TO RELATED APPLICATIONS/INCORPORATION BY REFERENCE

None.

FIELD

Various embodiments of the disclosure relate to Mobility-as-a-Service (MaaS) and distributed ledger technology. More specifically, various embodiments of the disclosure relate to a system and method for access management of publisher nodes for secure access to MaaS network.

BACKGROUND

In a traditional Mobility-as-a-Service (MaaS) platform, multiple transportation providers may provide their services through infrastructures, which may be based on a closed platform. Each of such transportation provider may have a separate ticket processing infrastructure (e.g., ticketing gates and Point-of-Sale (PoS) devices) or a separate application (e.g., a ticket booking application, ticket processing application, and a ride hailing application) to create, pay for, or manage a trip.

On a conventional MaaS platform, a transport provider may deploy new ticketing terminals to match up to a demand on a respective station (or pickup spot) or to replace faulty ticketing gates. In many cases, these new ticketing terminals may access a MaaS network in an insecure manner, which may lead to security concerns for the MaaS network. Currently, it takes a much longer time than required to repair and operationalize faulty ticketing terminals or replace a faulty ticketing terminal with an operational one, leading to operational bottlenecks in functioning of the MaaS network.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for access management of publisher nodes for secure access to Mobility-as-a-Service (MaaS) network, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
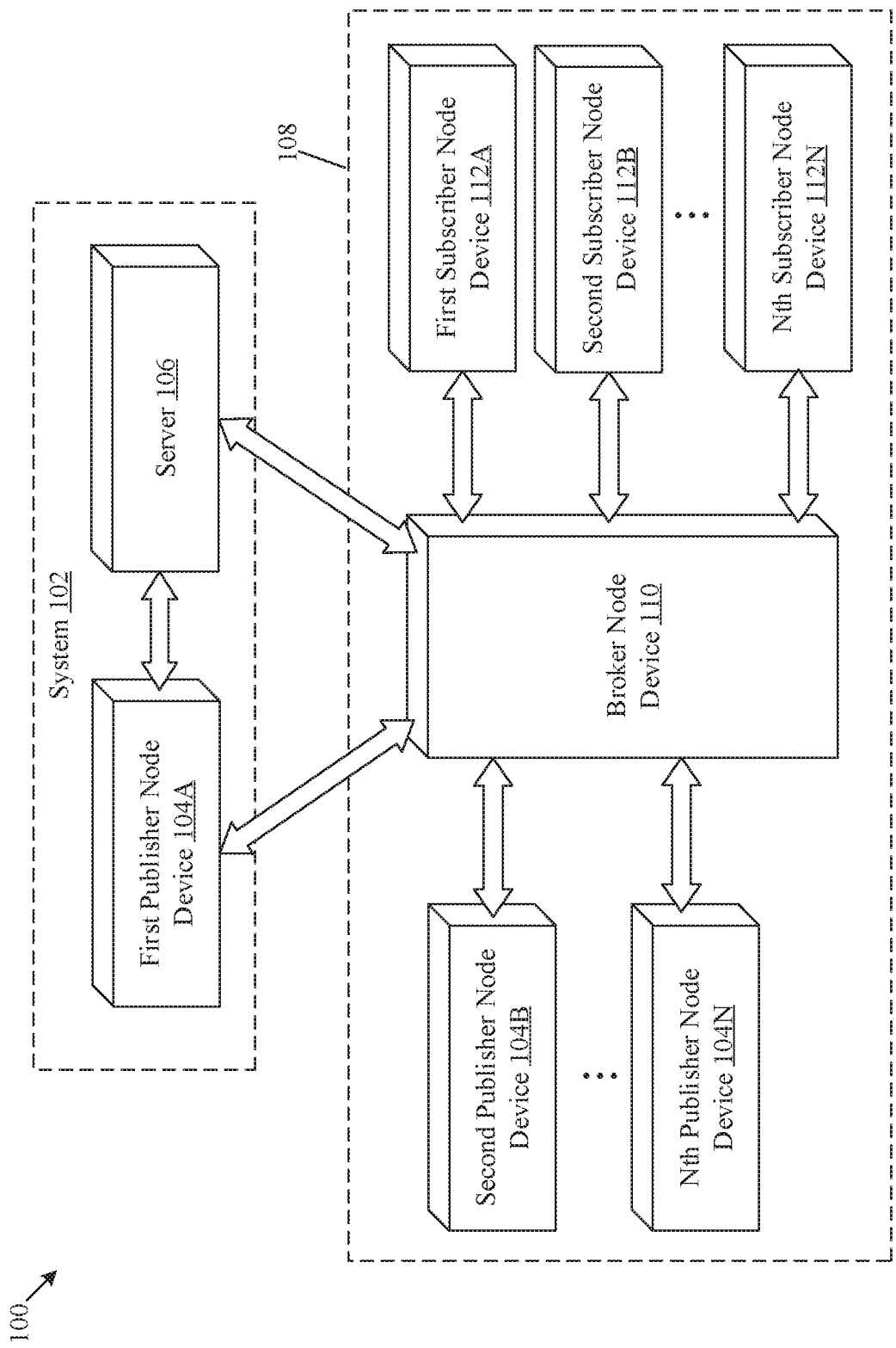
FIG. 1 is a diagram of an exemplary network environment for access management of a publisher node device for secure access to a Mobility-as-a-Service (MaaS) network, in accordance with an embodiment of the disclosure.

The following described implementations may be found in the disclosed system and method for access management of publisher nodes for secure access to Mobility-as-a-Service (MaaS) network. The disclosed system may be a part of a federated transportation management system that may facilitate multiple homogeneous or heterogenous transportation providers and their infrastructure, such as ticketing gates, applications, and/or Point of Sale (PoS) devices to operate on the MaaS network to provide various transportation services. Each transportation provider may enjoy secure data ownership and may control co-use of relevant transaction data through the distributed ledger. This may enhance connectivity between the various transportation providers.

Exemplary aspects of the disclosure provide a system that may include a server (for example, an authentication and authorization server) and a publisher node device (for example, a ticket reader device associated with a ticketing gate, a Point-of-Sale (PoS) device, or a mobile device with ticket processing application). The publisher node device may transmit a request for authentication to the server. The transmitted request may include authentication credentials associated with the publisher node device. The publisher node device may be further configured to receive a response to the transmitted request from the server. The response may include an authentication of the publisher node device as a ticket processing client for a transportation service, such as an intercity rail service or a ride sharing service. The authentication of the publisher node device with the server may prevent counterfeit or insecure publisher node devices (e.g., devices which may be hacked or may have a security breach) from accessing the nodes of the MaaS network as valid ticket processing clients.

The publisher node device may capture an event (for example, a ticket issuance or a ticket reading event) associated with the transportation service based on the received response from the server. Based on the captured event, the publisher node device may transmit a transaction request to a broker node device of a MaaS network associated with a publish-subscribe pattern. The transaction request may include a transaction message and an authorization request. Examples of the transaction message may include, but are not be limited to, a create message (on a creation or issuance of a ticket for the transportation service), a get-in message (to begin the transportation service for the user), and a get-out message (upon completion of the transportation service for the user). The authorization request may correspond to a request to route the transaction message to a subscriber node device (e.g., a node device which may process the transaction message for the transportation provider) of the MaaS network.

The broker node device may receive the transaction request from publisher node device and may forward the authorization request to the server. The server may receive the authorization request and authorize the broker node device to route the transaction message. Based on the authentication and the authorization, the publisher node device may securely transmit transaction messages to nodes (e.g., subscriber node devices or ledger nodes) of the MaaS network. The authorization from the server may be performed for a first transaction request or for every transaction request from the publisher node device. With authorization control, the server may be able to check and filter fraudulent, insecure, or malicious transaction messages to protect the MaaS network from unidentified or malicious security threats.

The server may perform the authentication and the authorization for both heterogenous publisher node devices (which may be capable to function as node devices of a single specific transportation provider) and homogeneous publisher node devices (that may be capable to function as node devices of any transportation provider across the MaaS network). Thus, the server may be capable to handle both homogenous and heterogenous publisher node devices.

The MaaS network may support a standard specification for communication. The publisher node devices (i.e., ticket readers) of all mobility providers across the MaaS network may follow a standard or common communication protocol for data exchange. The MaaS network may include homogeneous publisher node devices that may follow the MaaS standard specification for communication. The MaaS network may further include heterogeneous publisher node devices that may follow proprietary communication protocols. The MaaS network may offer plug-in based support to the publisher node devices so that such heterogeneous publisher node devices can be supported until the respective mobility providers adhere to and provide support for the MaaS standard specification for communication.

The MaaS network may provide a plugin architecture for the publisher node devices associated with different transportation providers to join the MaaS network. Through a node management device, the MaaS network may provide bulk cluster management of the publisher node devices. All publisher node devices may follow set protocols to operationalize on the MaaS network. The set protocols may mandate a common security architecture (for publisher node device authentication and authorization), a network protocol (e.g., HTTP, MQTT, AMQP, and the like), a uniform data request or response format (e.g., JSON, CSV, or XML format), and an API/data scheme. This may ensure that each publisher node device follows a cluster-level configuration (such as a device profile including a company name, a company ID, a gate ID, a gate number, and the like) and a device-level certificate (i.e., the authentication credential). The pattern of cluster-level configuration and the set protocols may facilitate transport providers to deploy new publisher nodes or replace existing publisher nodes with a plug-and-play approach. This may facilitate the MaaS network to function as a homogeneous transportation network with interoperability between resources (such as publisher node devices) of the various transportation providers.

In contrast, a conventional publisher node device may have a proprietary configuration (device profile or authentication credential) and proprietary connection methods to access and operationalize on the MaaS network. This may lead to interoperability issues with publisher node devices of other transport providers. In case of an urgent requirement, deployment of new or backup publisher node devices may take more than required. However, in case of the current disclosure, a plug-in based interface is provided to the publisher node devices. The plug-in-based interface may connect and support even the publisher node devices with proprietary connection protocols, till the respective mobility providers adhere to and provide support for the MaaS standard specification for communication. Thus, all mobility providers may continue to use the existing system and function with the current MaaS network, while the plug-in may take care of conversion of transaction messages associated with the proprietary communication protocol to a format suitable for a communication protocol associated with the MaaS standard specification.

FIG. 1 is a diagram of an exemplary network environment for access management of a publisher node device for secure access to a Mobility-as-a-Service (MaaS) network, in accordance with an embodiment of the disclosure. With reference to FIG. 1, there is shown a block diagram of a network environment 100. The network environment 100 may include a system 102. The system 102 may include a first publisher node device 104A and a server 106 which may be communicatively coupled to the first publisher node device 104A, via a communication network (not shown).

There is further shown a MaaS network 108 which may be associated with a publish-subscribe pattern. The MaaS network 108 may include a group of publisher node devices 104B . . . 104N, a broker node device 110, and a plurality of subscriber node devices 112A, 112B . . . 112N.

The first publisher node device 104A and the first subscriber node device 112A may be associated with a first transportation provider. Other node devices, such as the second publisher node device 104B and the second subscriber node device 112B may be associated with the first transportation provider or a second transportation provider which may be different from the first transportation provider.

In FIG. 1, the number of node devices are merely presented as an example and should not be construed as limiting for the disclosure. The present disclosure may also be applicable to more or a smaller number of node devices, without a deviation from the scope of the disclosure.

Each of the first publisher node device 104A and the group of publisher node devices 104B . . . 104N may include suitable logic, circuitry, code, and/or interfaces that may be configured to operate as a ticket processing client for a transport service of a respective transportation provider. For example, as a ticket processing client, each of the first publisher node device 104A and the group of publisher node devices 104B . . . 104N may read, issue, recharge, or cancel tickets to create events associated with the respective transport service. Based on such events, transaction messages may be communicated to one or more subscriber node devices of the MaaS network 108 through the broker node device 110. Examples of each of the first publisher node device 104A and the group of publisher node devices 104B . . . 104N may include, but are not limited to, a consumer electronic device with a trip planning or booking application, a ticket reader on a ticketing gate, a ticketing kiosk a Point-of-Sale (PoS) device, a mobile POS, a ticket vending machine, a smart door of a transport vehicle which may read a ticket to start or end a ride.

The server 106 may include suitable logic, circuitry, code and/or interfaces that may be configured to operate as an authentication/authorization (auth) server for node devices which may request to be commissioned as (active) ticket processing clients of the MaaS network 108. For example, the server 106 may authenticate a publisher node device (such as the first publisher node device 104A) to operate as a (valid) ticket processing client for the MaaS network 108. When the publisher node device is authenticated, the server 106 may act as an authorization server and may authorize the broker node device 110 to route transaction requests from the authenticated publisher node device to a subscriber node device (such as the first subscriber node device 112A). Examples of the server 106 may include, but are not limited to, an application server, a cloud server, a mainframe server, a database server, a web server, or other type of servers.

The broker node device 110 may include suitable logic, circuitry, code, and/or interfaces that may be configured to route transaction messages from a publisher node device (such as the first publisher node device 104A) to a subscriber nodes device (such as the first subscriber node device 112A). Decisions to authorize the broker node device 110 to route such transaction messages to the subscriber nodes device may be determined by the server 106. Example implementations of the broker node device 110 may include, but are not limited to, an application server, a cloud server, a mainframe server, a database server, a web server, or other type of servers.

The broker node device 110 may be configured to communicate with each of the first publisher node device 104A, the group of publisher node devices 104B . . . 104N, and the plurality of subscriber node devices 112A, 112B . . . 112N through a suitable publish-subscribe network protocol, such as, but not limited to, a Message Queuing Telemetry Transport (MQTT)-based messaging protocol, an Advanced Message Queuing Protocol (AMQP)-based messaging protocol, or a Message-Oriented Middleware (MOM)-based messaging framework.

Each of the plurality of subscriber node devices 112A, 112B . . . 112N may include suitable logic, circuitry, code, and/or interfaces that may be configured to receive the transaction messages through the broker node device 110 from one or more of the first publisher node device 104A and the group of publisher nodes devices 104B . . . 104N. Each transaction message may include a topic which may be subscribed by one or more subscriber nodes of the plurality of subscriber node devices 112A, 112B . . . 112N. Examples of implementation of a subscriber node device may include, but are not limited to, a web server, an edge device, an edge node, a cloud server, a cluster of cloud-based servers, a workstation, or any computing device with a fog computing capability.

In operation, the first publisher node device 104A may be configured as an inactive ticket processing client, which may be unauthenticated and unauthorized to communicate with nodes of the MaaS network 108. The first publisher node device 104A may be required to request the server 106 for authentication so as to commission itself as a valid publisher node (i.e. an active ticket processing client) of the MaaS network 108.

In order to serve as the ticket processing client for a first transportation service of the first transport provider, the first publisher node device 104A may transmit a request for authentication to the server 106. The request for the authentication may include an authentication credential associated with the first publisher node device 104A. Examples of the authentication credential may include, but are not limited to, a device identifier (ID), a network ID, or a client certificate associated with the first publisher node device 104A.

The server 106 may receive the request including the authentication credential from the first publisher node device 104A. Thereafter, the server 106 may authenticate the first publisher node device 104A based on the authentication credential and may transmit a response to the first publisher node device 104A based on the authentication.

The first publisher node device 104A may receive the response to the transmitted request from the server 106. The response may include authentication of the first publisher node device 104A as the ticket processing client for the first transportation provider. Based on the response received from the server 106, the first publisher node device 104A may be configured to capture, as the (active) ticket processing client, an event associated with the first transportation service. As one example, the captured event may correspond to issuance of a ticket for a trip associated with the first transportation service of the first transportation provider. As another example, the captured event may correspond to a reading operation of a pre-issued ticket to capture a start or an end of a trip. Details related to the captured event are explained further, for example, in FIG. 2 and FIG. 3. Based on the captured event, the first publisher node device 104A may generate a transaction request and transmit the generated transaction request to the broker node device 110 of the MaaS network 108. The transaction request may include a transaction message and an authorization request to route the transaction message to the first subscriber node device 112A of the MaaS network 108.

The broker node device 110 may receive the transaction message and the authorization request from the first publisher node device 104A. Upon reception, the broker node device 110 may transmit (or forward) the authorization request to the server 106 to seek authorization to route the transaction message received from the first publisher node device 104A. In accordance with an embodiment, the authorization request may include a first device profile associated with the first publisher node device 104A and the authentication credential associated with the first publisher node device 104A. The first device profile may include, for example, a company name, a company identifier (ID), a station name, a station ID, a gate name, a gate ID, a geography, a region, or an address associated with the first publisher node device 104A.

The server 106 may receive the authorization request from the broker node device 110 and may authorize the broker node device 110 to route the transaction message based on the first device profile and the authentication credential in the authorization request. By way of example, and not limitation, the server 106 may store a list of whitelisted transportation providers and profiles of the whitelisted transportation providers. Such profiles may include, for example, company names of the transportation providers, company IDs, station names, station IDs, (ticket) gate names, gate IDs, geographies (i.e. location information), addresses (such as a list of registered IP addresses)

used by the transportation providers, and the like. In order to authorize the broker node device 110, the server 106 may compare information included in the first device profile with the stored profiles of the valid transportation providers to determine if the first publisher node device 104A corresponds to one of the whitelisted transportation providers. Additionally, or alternatively, the server 106 may compare the authentication credential in the authorization request with a stored version of the authentication credential on the server 106 to authorize the broker node device 110.

Figure 2:
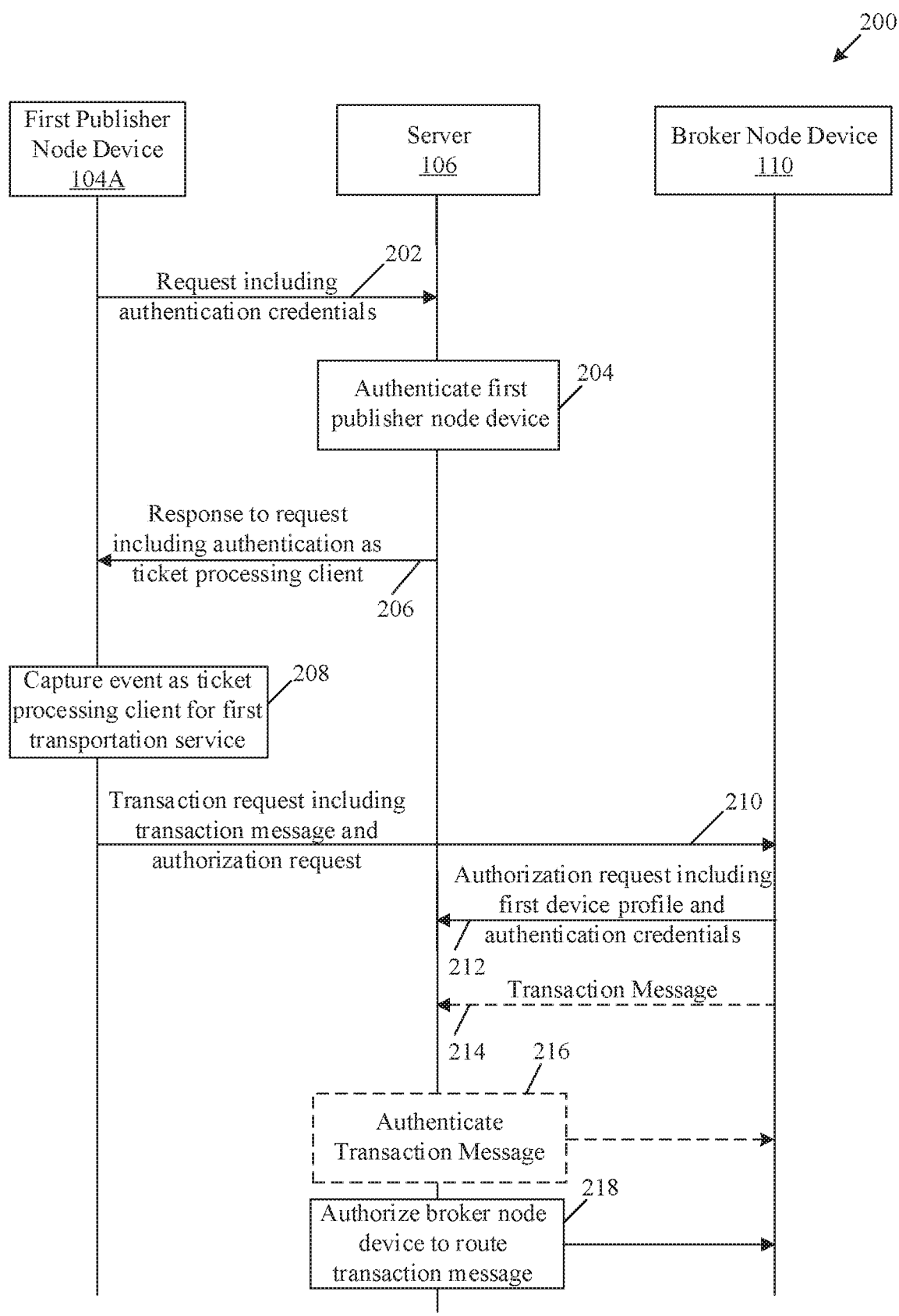
FIG. 2 is a sequence diagram that illustrates exemplary operations for access management of a publisher node device for secure access to a MaaS network, in accordance with an embodiment of the disclosure.

The access management of a publisher node device (e.g., the first publisher node device 104A) for secure access to the MaaS network 108 is explained further, for example, in FIG. 2. An exemplary implementation of the MaaS network 108 as a distributed ledger based MaaS network is provided, for example, in FIG. 3.

In FIG. 1, the server 106 is shown as a separate entity from the broker node device 110. However, the scope of the disclosure may not be so limiting and in some embodiments, the entire functionality of the server 106 and the broker node device 110 may be incorporated in an intelligent broker device, without a deviation from the scope of the disclosure. Further, in certain scenarios, each of the plurality of publisher node devices 104A, 104B, . . . 104N may be directly interfaced to the server 106 for authentication prior to transmission of transaction messages to the broker node device 110.

In an embodiment, the MaaS network 108 may support a standard specification for communication. Certain publisher node devices (i.e., ticket readers) of the MaaS network 108 may follow the standard or common communication protocol for data exchange associated with the MaaS network 108. Such publisher node devices may be called as homogeneous publisher node devices. The MaaS network may further include heterogeneous publisher node devices that may follow proprietary communication protocols. The MaaS network 108 may offer plugin-based based support to the publisher node devices 104A, 104B, . . . 104N so that such heterogeneous publisher node devices can be supported until the respective mobility providers adhere to and provide support for the MaaS standard specification for communication. Details related to the plugin-based support are explained further, for example, in FIGS. 6A and 6B.

FIG. 2 is a sequence diagram that illustrates exemplary operations for access management of a publisher node device for secure access to a MaaS network, in accordance with an embodiment of the disclosure. FIG. 2 is explained in conjunction with elements from FIG. 1. With reference to FIG. 2, there is shown a sequence diagram 200 that illustrates a sequence of operations from 202 to 218. The sequence of operations may be executed by various components of the system 102 of FIG. 1 and the MaaS network 108.

At 202, a request including an authentication credential associated with the first publisher node device 104A may be transmitted to the server 106. In an embodiment, the first publisher node device 104A may transmit the request including the authentication credential associated with the first publisher node device 104A to the server 106. The request may be transmitted in a data format, such as, but not limited to, a Java Script Object Notation (JSON) format, a Comma Separated Values (CSV) format, or an eXtensible Markup Language (XML) format. In an embodiment, the first publisher node device 104A may transmit the request to the server 106 using transport layer security (TLS) and one or more encryption techniques. Examples of the authentication credential associated with the first publisher node device 104A may include, but are not limited to, a device identifier (ID), a network ID, or a client certificate associated with the first publisher node device 104A.

In accordance with an embodiment, use of a device ID/network ID, or a client certificate as the authentication credential may depend upon an authentication option selected by an admin of the first transportation provider. For example, the first publisher node device 104A may receive a user input which may include a selection of an authentication option as one of a network-based authentication option or a certificate-based authentication option. The first publisher node device 104A may select the authentication credential as one of the device ID/network ID, or the client certificate based on the selected authentication option. For example, if the user input includes the network-based authentication option as the selected authentication option, then the first publisher node device 104A may use the network ID as the authentication credential associated with the first publisher node device 104A. The network ID may correspond to, for example, a Subscriber Identification Module (SIM) card, which may be pre-authenticated/registered with the MaaS network 108 for use as a hardware token on a suitable publisher node device of the first transportation provider. If the first transportation provider installs the SIM card as the hardware token of the first publisher node device 104A, then the network ID associated with the SIM card may act as the authentication credential of the first publisher node device 104A. Alternatively, if the user input includes the certificate-based authentication option as the selected authentication option, the first publisher node device 104A may use the client certificate as the authentication credential associated with the first publisher node device 104A. The client certificate may be pre-issued to the first publisher node device 104A by the server 106 or a node of the MaaS network 108.

Each of the network-based authentication option and the certificate-based authentication option may be referred to as a collect-point, such as a network-based collect-point which uses a network ID and a certificate collect-point which uses the client certificate. Such points may be stored in a hardware token device (such as a hardware token device of FIG. 7) associated with the first publisher node device 104A. To replace an existing authentication option with a new authentication option, the existing collect-point may be replaced with a new collect-point in the hardware token device. Alternatively, to add a new authentication option, a new collect-point may be added in the hardware token device without replacement of an existing collect-point associated with an existing authentication option.

At 204, the first publisher node device 104A may be authenticated. In an embodiment, the server 106 may authenticate the first publisher node device 104A based on the authentication credential (received at 202) associated with the first publisher node device 104A. For example, if the authentication credential includes the network ID, the server 106 may search the network ID within a stored whitelist of network IDs associated with various transport providers. In case the network ID is present in the stored whitelist, then the server 106 may authenticate the first publisher node device 104A. Alternatively if the authentication credential includes the client certificate associated with the first transportation provider, then the server 106 may verify that the first publisher node device 104A is the true owner of the client certificate to authenticate the first publisher node device 104A. As an example, if the authentication is based on a client-authenticated Transport Layer Security (TLS) handshake, then the client certificate may be associated with a public key and a private key which may be known to the first publisher node device 104A (if the first publisher node device 104A is the true owner of the client certificate). The server 106 may use the public key of the client certificate to verify a signature of a handshake message (which may be shared by the first publisher node device 104A) and to validate that the first publisher node device 104A is the true owner of the client certificate. If validated, the server 106 may authenticate the first publisher node device 104A. In case the authentication fails, a device log stored on the first publisher node device 104A may be checked by an IT admin and appropriate measures may be adopted to rectify the authentication credential or replace/repair the hardware token device associated with the first publisher node device 104A. In an embodiment, the device logs may include user access details and node manipulation details. The device logs may be used for audit and compliance check. If the authentication fails again when another authentication attempt is made after the rectification, then the server 106 may add the first publisher node device 104A to a blacklist of devices which may be temporarily or permanently barred from further authentication attempts.

At 206, a response to the request from the first publisher node device 104A may be transmitted to the first publisher node device 104A. In an embodiment, the server 106 may transmit the response to the first publisher node device 104A based on the authentication (at 204) of the first publisher node device 104A. The response may include, for example, a message which indicates a successful authentication of the first publisher node device 104A or an authentication token with a set validity period for the first publisher node device 104A. The first publisher node device 104A may receive the response from the server 106 and may activate itself to operate as a ticket processing client for the first transportation service based on received response.

At 208, an event may be captured for the first transportation service. As the ticket processing client for the first transportation service, the first publisher node device 104A may capture the event based on the response received from the server 106 (at 206).

In an embodiment, the first publisher node device 104A may capture the event by reading an electronic ticket that may be issued to a user for the first transportation service. For example, the first publisher node device 104A may operate as a ticket reader at a ticketing gate of a station of a metro, train, or a bus service. As a ticket reader, the first publisher node device 104A may capture the event based on a scan of a non-electronic ticket or an electronic ticket, such as an Integrated Circuit (IC) card, a chip card, a smart card, a contactless card, a Near-Field Communication (NFC)-based card, a bar coded card, a Quick-Response coded card associated with the first transportation provider. The non-electronic ticket may include digital codes, patterns, symbols, or passcodes which may be scanned or manually entered on a user interface associated with the first publisher node device 104A.

In another embodiment, the first publisher node device 104A may be installed at a transportation service terminal associated with the first transportation provider. The transportation service terminal may include an electronic interface associated with the first publisher node device 104A. Based on an input via the electronic interface, the first publisher node device 104A may capture the event associated with a MaaS transaction, such as issuance, recharge, or scan/read of an electronic ticket for the first transportation service.

For example, the received input may correspond to a request for a creation of a MaaS-based transportation service for the user. The MaaS-based transportation service may include a combination of several transportation services, such as the first transportation service and/or other multimodal or monomodal transportation services. Based on the received input, the first publisher node device 104A may capture the event as the request for creation of the MaaS-based transportation service for the user. Additionally, or alternatively, the received input may correspond to a request to initiate the first transportation service of the created MaaS-based transportation service. The input may be captured, for example, when a cab ride is started or when the user places a ticket for a scan through a ticket reader (i.e. the first publisher node device 104A) at a railway ticketing gate to board a train. Based on the request, the first publisher node device 104A may capture the event as the request to initiate or start the first transportation service of the MaaS-based transportation service for the user. Additionally, or alternatively, the received input may correspond to a request to end the first transportation service of the MaaS-based transportation service. The input may be captured, for example, when a cab ride ends or when the user places the ticket for a scan through a ticket reader (i.e. the first publisher node device 104A) at an electronic railway exit gate after disembarking from a train. The first publisher node device 104A may capture the event as the request to complete the first transportation service of the MaaS-based transportation service for the user.

In accordance with an embodiment, the first publisher node device 104A may generate a transaction message based on the captured event. With reference to the previous example, if the captured event corresponds to a creation of the MaaS-based transportation service, then the first publisher node device 104A may generate a transaction message, i.e. a create message for subscriber node devices (two or more of the plurality of subscriber node devices 112A, 112B . . . 112N) of the MaaS network 108. Each of the subscriber node devices may be associated with one of various transportation services included in the MaaS-based transportation service. If the captured event corresponds to a start of the first transportation service of the MaaS-based transportation service, then the first publisher node device 104A may generate a transaction message, i.e. a get-in message for the first subscriber node device 112A associated with the first transportation service. Alternatively, if the captured event corresponds to an end or completion of the first transportation service of the MaaS-based transportation service, then the first publisher node device 104A may generate a transaction message, i.e. a get-out message for the first subscriber node device 112A associated with the first transportation service. Details related to the transaction message are described further, for example, in FIG. 3.

At 210, a transaction request including the transaction message and an authorization request may be transmitted to the broker node device 110. In an embodiment, the first publisher node device 104A may transmit the transaction request including the transaction message and the authorization request to the broker node device 110 based on the captured event. The first publisher node device 104A may use a suitable publish-subscribe network protocol, such as, but not limited to, MQTT-based messaging protocol, AMQP-based messaging protocol, or HTTP-based messaging protocol, or a MOM-based messaging framework to transmit the transaction request to the broker node device 110.

In an embodiment, the authorization request may include a first device profile associated with the first publisher node device 104A and the authentication credential associated with the first publisher node device 104A. The first device profile may include, for example, a company name, a company identifier (ID), a station name, a station ID, a gate name, a gate ID, a geography, a region, an address associated with the first publisher node device 104A, and the like. The authorization request may be transmitted to seek authorization from the server 106 to allow the broker node device 110 to route the transaction message to the first subscriber node device 112A and/or other subscriber node devices of the MaaS network 108. The broker node device 110 may receive the transaction request including the transaction message and the authorization request from the first publisher node device 104A.

At 212, the authorization request including the first device profile and the authentication credential associated with the first publisher node device 104A may be transmitted to the server 106. In an embodiment, the broker node device 110 may transmit the authorization request to the server 106.

At 214, the transaction message may be transmitted to the server 106 along with the first device profile and the authentication credential in the authorization request. In an embodiment, the broker node device 110 may transmit the transaction message to the server 106 along with the first device profile and the authentication credential in the authorization request.

At 216, the transaction message may be authenticated as a valid message from the first publisher node device 104A based on the first device profile. In an embodiment, the server 106 may authenticate the transaction message as a valid message from the first publisher node device 104A based on the first device profile. For example, the server 106 may match attributes, such as the company name, the company ID, or the station ID in the transaction message with the company name, the company ID, or the station ID in the first device profile (shared by the broker node device 110). In case of a mismatch, the transaction message may be considered as invalid and flagged as malicious. In case of a match, the transaction message may be authenticated as a valid message.

At 218, the broker node device 110 may be authorized to route the transaction message. In an embodiment, the server 106 may receive the authorization request including the first device profile and the authentication credential from the broker node device 110 and may authorize the broker node device 110 to route the transaction message based on the received authorization request. In some embodiments, the server 106 may authorize the broker node device 110 based on the validation of transaction message at 216.

In one embodiment, the server 106 may validate the first device profile based on a search within a stored whitelist of device profiles associated with various transport providers. For example, one or more of the company name, the company ID, the station name, the station ID, the gate name, the gate ID, the geography, the region, or the address associated with the first publisher node device 104A may be searched individually or as a combined string in the stored whitelist of device profiles to validate the first device profile. In another embodiment, the server 106 may verify that the authentication credential associated with the first publisher node device 104A is valid and the first publisher node device 104A corresponds to a whitelisted publisher node device of the first transportation provider and the MaaS network 108. Based on the validation of the first device profile and/or the verification of the authentication credential, the server 106 may instruct the broker node device 110 to route the transaction message included in the transaction request to an appropriate subscriber node device (such as the first subscriber node device 112A). Thus, the server 106 may authenticate the first publisher node device 104A based on the authentication credentials (i.e., device-level certificate) and the first device profile (i.e., cluster-level configuration) of the first publisher node device 104A. Further, the server 106 may authenticate the transaction message to be routed by the broker node device 110 to the MaaS network 108 based on the authentication credentials and the first device profile. Detailed operations of the MaaS network 108 are explained further, for example, in FIG. 3.

Figure 3:
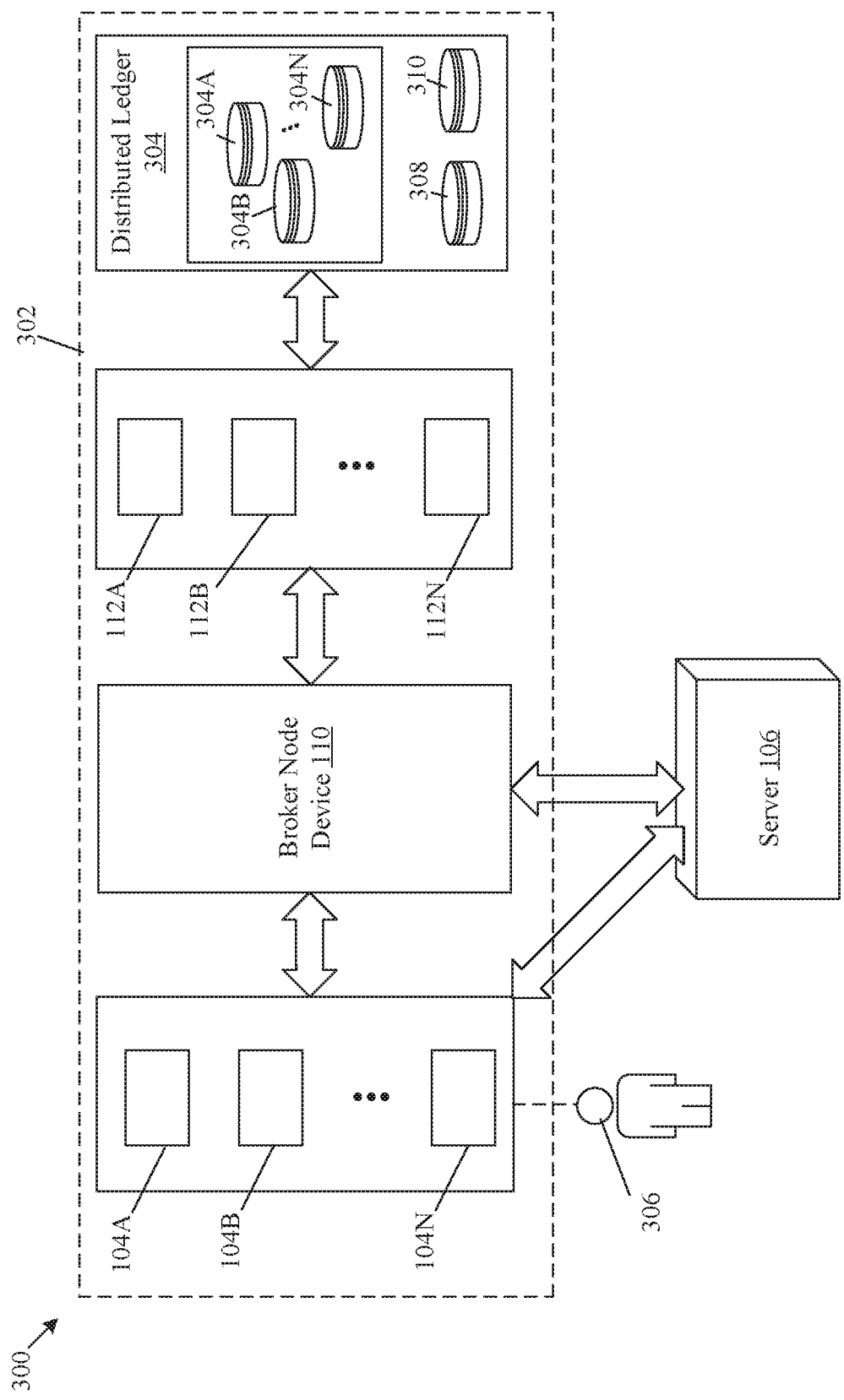
FIG. 3 is a diagram that illustrates an exemplary implementation of the MaaS network of FIG. 1, in accordance with an embodiment of the disclosure.

FIG. 3 is a diagram that illustrates an exemplary implementation of the MaaS network of FIG. 1, in accordance with an embodiment of the disclosure. FIG. 3 is described with reference to elements from FIG. 1 and FIG. 2. With reference to FIG. 3, there is shown a diagram 300 of the MaaS network 302. The MaaS network 302 is an exemplary implementation of the MaaS network 108 of FIG. 1. The MaaS network 302 includes the first publisher node device 104A and the group of publisher node device 104B . . . 102N (hereinafter, collectively referred to as a plurality of publisher nodes) associated with a plurality of transportation providers.

The MaaS network 302 further includes the broker node device 110 and the plurality of subscriber node devices 112A, 112B . . . 112N associated with the plurality of transportation providers. In the diagram 300, there is shown the server 106 that may be communicatively coupled to each of the plurality of publisher node devices and the broker node device 110. The number of the publisher node devices and the subscriber node devices in FIG. 3 are merely presented as example. The present disclosure may also be applicable to more or lesser number of the publisher node devices and the subscriber node devices, without a deviation from the scope of the disclosure.

Each of the plurality of subscriber node devices 112A, 112B . . . 112N may be associated with a corresponding node of a distributed ledger 304. For example, the first subscriber node device 112A may be associated with a first node 304A of the distributed ledger 304, the second subscriber node device 112B may be associated with a second node 304B of the distributed ledger 304, and the Nth subscriber node device 112N may be associated with an Nth node 304N of the distributed ledger 304.

In an embodiment, at least two nodes of the distributed ledger 304 may store transaction data associated with a MaaS transportation service. The MaaS transportation service may be associated with one or more of: the plurality of transportation providers and/or a user 306 who may avail the MaaS transportation service through a unified MaaS interface or through the plurality of publisher node devices. The transaction data associated with the MaaS transportation service may be included in a set of state objects, such as an initial state object and an updated version of the initial state object. Each state object may include a smart contract, a contract code (or rules of a transaction upon which parties to the transaction agree), and state properties (that may be updated when the transaction data is updated based on transaction requests from publisher node devices).

The MaaS network 302 further includes a counter-party node 308 and a consensus node 310, each of which may be associated with the distributed ledger 304. For example, the distributed ledger 304 may include the counter-party node 308 (also referred to as a MaaS provider node) and the consensus node 310.

In at least one embodiment, the distributed ledger 304 may be a decentralized and distributed database system that may maintain an immutable record of data operations or transactions. A set of data operations may be grouped together as a block and may be further linked to a previous block of data operations to form a chain of a plurality of blocks. All blocks of data operations may be stored in a decentralized manner, whereby at least two participants or nodes of the distributed ledger 304 may store a subset of the plurality of blocks associated with one or more transactions in which the at least two participants or nodes may participate. Further, the distributed ledger 304 may include an operating system (for example, a Java Virtual Machine (JVM)) which may allow for deployment of a smart contract between multiple parties, for example, mobility provider node(s) (also referred to as a transportation provider node, such as the first node 304A of the first transportation provider) and the counter-party node 308 (i.e. the MaaS provider node).

By way of example, and not limitation, the distributed ledger 304 may be a Corda blockchain, an Ethereum blockchain, or a Hyperledger blockchain. The distributed ledger 304 may store a set of immutable state objects that may be tracked by the distributed ledger 304. The state object may include transaction data, such as a smart contract between parties, contract code (rules of transaction), and content including state properties with certain state values. The smart contract may include a set of conditions under which multiple parties to the smart contract may agree to interact with each other. The smart contract may run on one or more nodes of the distributed ledger 304 and may govern transitions between state objects to generate a transaction. The smart contract may be written once, reused for a large numbers of state objects, and may refer to a governing legal prose by way of cryptographic hashes.

The distributed ledger 304 may use secure cryptographic hashes to identify parties and data and also to link a state object to a previous version of the state object to provide chains of provenance. A transaction between a group of parties may be stored on the distributed ledger 304 such that only the group of parties associated with the transaction may be able to view the transaction. A party associated with a transaction may store a current state object of the transaction in a vault (a database associated with the distributed ledger 304). Another party eligible to view or process the transaction (e.g., validate the transaction) may retrieve the current state object of the transaction from the vault. Additionally, each state object of the distributed ledger 304 may include a smart contract between the parties or nodes that may participate in an associated transaction.

On the distributed ledger 304, a participant or a node (for example, the first node 304A) may update a transaction by updating state properties of an input state object (for example, the first state object) to produce an output state object (for example, the second state object). The updated transaction may thereby create a chain of provenance (which may be associated with the transaction data). The distributed ledger 304 may provide a consensus for the updated transaction based on a determination of a validity of the updated transaction and a determination of a uniqueness of the updated transaction. In an embodiment, the participants of nodes associated with the updated transaction may determine the validity of the updated transaction by an independent execution of smart contracts and validation logic associated with the transaction. Further, a consensus node (e.g., the consensus node 310) associated with the distributed ledger 304 may determine the uniqueness of the updated transaction based on a check that there exists no other transaction that has reached a consensus by use of the same input state object as the current transaction.

In accordance with an embodiment, the distributed ledger 304 may be associated with a decentralized application that may include a client-side interface (a front-end) and a server-side interface (a back end). The decentralized application may be configured to implement a workflow (e.g., a Corda flow) associated with the blockchain to record a transaction on a node of the distributed ledger 304 (such as the first node 304A of the distributed ledger 304). The client-side interface may be hosted on each of the plurality of subscriber node devices 112A, 112B . . . 112N and the client-side interface may be configured to load up on a client associated with a subscriber node. For example, the client-side interface of the decentralized application may be a Remote Procedure Call (RPC) client that may be configured on each subscriber node and the counter-party node 308 (i.e. the MaaS provider node). The server-side interface of the decentralized application may run on each node of the distributed ledger 304 associated with a corresponding subscriber node and the counter-party node 308.

In an embodiment, the transaction request from a publisher node may initiate a MaaS transaction between a mobility provider node (such as the first node 304A of the distributed ledger 304) and a MaaS provider node (i.e. the counter-party node 308). The distributed ledger 304 may store records for the MaaS transaction between two parties, i.e., the mobility provider node (e.g., the first node 304A of the first mobility provider) and the MaaS provider node (i.e. the counter-party node 308).

In case of multiple MaaS providers, the diagram 300 of the exemplary implementation may include a plurality of MaaS provider nodes, each of which may be associated with a certain MaaS provider and may be included in a separate distributed ledger for the respective MaaS provider. In certain scenarios, the plurality of MaaS provider nodes may be included in a common distributed ledger, such as the distributed ledger 304.

In an embodiment, the first node 304A may be one of many database nodes of the distributed ledger 304 and may be configured to receive a transaction message via the first subscriber node device 112A. The first node 304A may be configured to update an initial state object associated with the distributed ledger 304 based on the transaction message to output an updated state object. The first node 304A may build a transaction that may include the initial state object with initial transaction data and the updated state object with updated transaction data.

The counter-party node 308 may be associated with a MaaS provider and may be also referred to a MaaS provider node. In an embodiment, the counter-party node 308 may include suitable logic, circuitry, code, and/or interfaces that may be configured to process a transaction message received from a subscriber node of the plurality of subscriber node devices 112A, 112B . . . 112N. The consensus node 310 may include suitable logic, circuitry, code, and/or interfaces that may be configured to notarize a transaction associated with the distributed ledger 304.

In operation, the first publisher node device 104A (authenticated at 204) may transmit a transaction request to the broker node device 110. The transaction request may include the transaction message and the authorization request to route the transaction message to the first subscriber node device 112A. In an embodiment, the first publisher node device 104A may generate and transmit the transaction request based on the captured event (at 208 of FIG. 2). Upon reception of the transaction request, the broker node device 110 may seek authorization from the server 106. Based on the authorization request, the server 106 may authorize the broker node device 110 to route the transaction message to the first subscriber node device 112A.

In an embodiment, the transaction message may be a create message. The create message may include details of transportation providers, travel plan/route associated with each transportation service included in the MaaS transportation service, a source location, a destination location, or intermediate locations between the source location and the destination location. The create message may also include payment details associated with the entire bundle of transportation services booked by the user 306. After the broker node device 110 is authorized by the server 106, the broker node device 110 may transmit the transaction message (i.e. create message) to all subscriber node devices that may be associated with the MaaS transportation service (e.g., a combination of a bus service, a cab service, and a flight service). Based on the create message, each subscriber node device may instruct the corresponding node of the distributed ledger 304 to create and store an initial state object on the distributed ledger 304.

In another embodiment, the transaction message may be a get-in message. When the transportation service is started for the user 306, the first publisher node device 104A may transmit the get-in message to the first subscriber node device 112A of the first transportation provider through the broker node device 110.

In another embodiment, the transaction message may be a get-out message. When the transportation service is completed for the user 306, the first publisher node device 104A may transmit the get-out message to the first subscriber node device 112A through the broker node device 110.

The first subscriber node device 112A may receive the transaction message from the broker node device 110 and may share the transaction message with the first node 304A of the distributed ledger 304. The first node 304A of the distributed ledger 304 may receive the transaction message and may execute a transaction associated with the first transportation service based on information associated with the captured event in the received transaction message. To execute the transaction, the first node 304A may retrieve the initial state object and may update transaction data included in the first state object based on the received transaction message. The transaction data may be associated with information, such as, but not limited to, ticketing information, subscription information, payment information, revenue sharing information, or transportation service information.

In an exemplary scenario, a transportation service may be created for a scheduled travel plan of the user 306 to ride a bus at 11:00 AM to airport, board a flight at 1:00 PM from the airport, followed by a cab ride at 8:00 PM from the airport to a hotel. For the bus ride, when the user 306 starts the bus ride, a publisher node device associated with the bus ride provider may transmit a transaction message to a subscriber node device of the bus ride provider. The transaction message may be a get-in message including details of trip (such as a pickup or drop location, a pickup time, etc.), subscription details, or user details. When the user 306 deboards the bus at end of journey, the publisher node device associated with the bus ride provider may again transmit a transaction message to the subscriber node device of the bus ride provider. The transaction message may be a get-out message including trip details (such as a trip time, drop location, etc.), subscription details, trip bill, or user details. The subscriber node may forward the get-in message or the get-out message to its associated node of the distributed ledger 304. The associated node of the distributed ledger 304 may update the initial state object to produce a new state object with updated transaction data based on the get-in message or the get-out message.

For example, if the state properties of the initial state object include a total paid amount of 500 US Dollars (USD) for the (multi-trip) MaaS transportation service, then the updated transaction data of the new state object may include the total paid amount and a billed amount of 10 USD for the trip associated with the bus ride provider. Similarly, for all other trips (flight and cab to hotel) of the MaaS transportation service, respective nodes of the distributed ledger 304 for the flight provider and the cab ride provider may update the new state object sequentially in the order in which the user 306 may complete a trip with the flight and a trip with the cab. At the end of the last trip, the counter-party node 308 (i.e. the MaaS provider node) may read a state object (whichever is last updated) to settle payments for each of the bus ride provider, flight provider, and the cab ride provider.

In at least one embodiment, the MaaS network 302 may support an open standard specification for MaaS. In such a case, publisher node devices (e.g., ticket readers or sensor devices) of different companies associated with various transportation providers of the MaaS network 302 may join the MaaS network 302 as homogeneous publisher node devices. Additionally, legacy ticket readers or sensor devices may connect to the MaaS network 302 based on leverage of standard communication protocols, such as, MQTT or AMQP. By use of standard communication protocols, the MaaS network 302 may provide ticket roaming functionality to users. For example, a ticket reader of any transportation provider may scan an electronic ticket of a user for MaaS transportation service and may provide the respective transportation service of the transportation provider to the user (irrespective of the issuer of the ticket) based on seamless and secure access of the MaaS network 302.

In an embodiment, the MaaS network 302 may support an MaaS standard specification such that communication of messages and data exchange in the MaaS network 302 may be over a standard communication protocol. Certain publisher node devices of some mobility providers may support the MaaS standard specification and may communicate transaction messages in the standard communication protocol. Such publisher node devices may be called as homogeneous publisher node devices. However, certain other publisher node devices may not support the standard communication protocol and may use their proprietary or legacy communication protocols to communicate transaction messages. Such publisher node devices may be called as heterogenous publisher node devices. In an embodiment, the MaaS network 302 may provide a plugin-based support to the publisher node devices 104A, 104B, . . . 104N such that message formats of the heterogenous publisher node devices may be converted to the message formats of the standard communication protocol. Thus, the heterogeneous publisher node devices may also work with the MaaS network 302 through the plug-in.

The MaaS transportation service may be provided by homogeneous transportation providers (e.g., multiple cab ride provider companies) or heterogenous transportation providers (multimodal transportation providers) through a homogenous group of devices, applications, or ticketing gates, or a heterogenous group of ticketing gates, applications, and PoS devices of various transportation providers. The MaaS transportation service may be a combination of individual service offerings of one or more homogenous or heterogeneous transportation providers. For example, a ticketing gate, a ride hailing app, or a PoS terminal of a MaaS provider may receive a request for creation of a MaaS transportation service (e.g., a combination of bus, cab, and flight) from the user 306 via the input. The MaaS transportation service may include, for example, a train service, a bus service, a taxi/cab service, a metro rail service, an air-plane service, a fleet service, a ride hailing service, a car sharing service, a carpool service, a car rental service, a bike sharing service, or a combination thereof.

Each transportation provider may enjoy secure data ownership of the transaction data through the distributed ledger 304. Since, the MaaS network 302 of is implemented using the distributed ledger 304, each transportation provider may own a node on the distributed ledger 304. The node of the distributed ledger 304 associated with a transportation provider may store transaction data relevant to the transportation provider. The counter-party node 308 (i.e. the MaaS provider node) may also store the same transaction data. This may ensure secure ownership of data amongst the MaaS provider and the transportation providers. This may also enhance connectivity between the various transportation providers. With sharing of Information Technology (IT) infrastructure amongst the transportation providers, costs associated with owned IT infrastructure for each transportation provider may be less as compared to costs when each transportation provider maintains its own closed-platform IT infrastructure. The distributed ledger 304 may facilitate ticketing management, subscription management, payment management, revenue sharing, and/or transportation service management for multiple transportation providers based on transaction data records on the distributed ledger 304.

Figure 4:
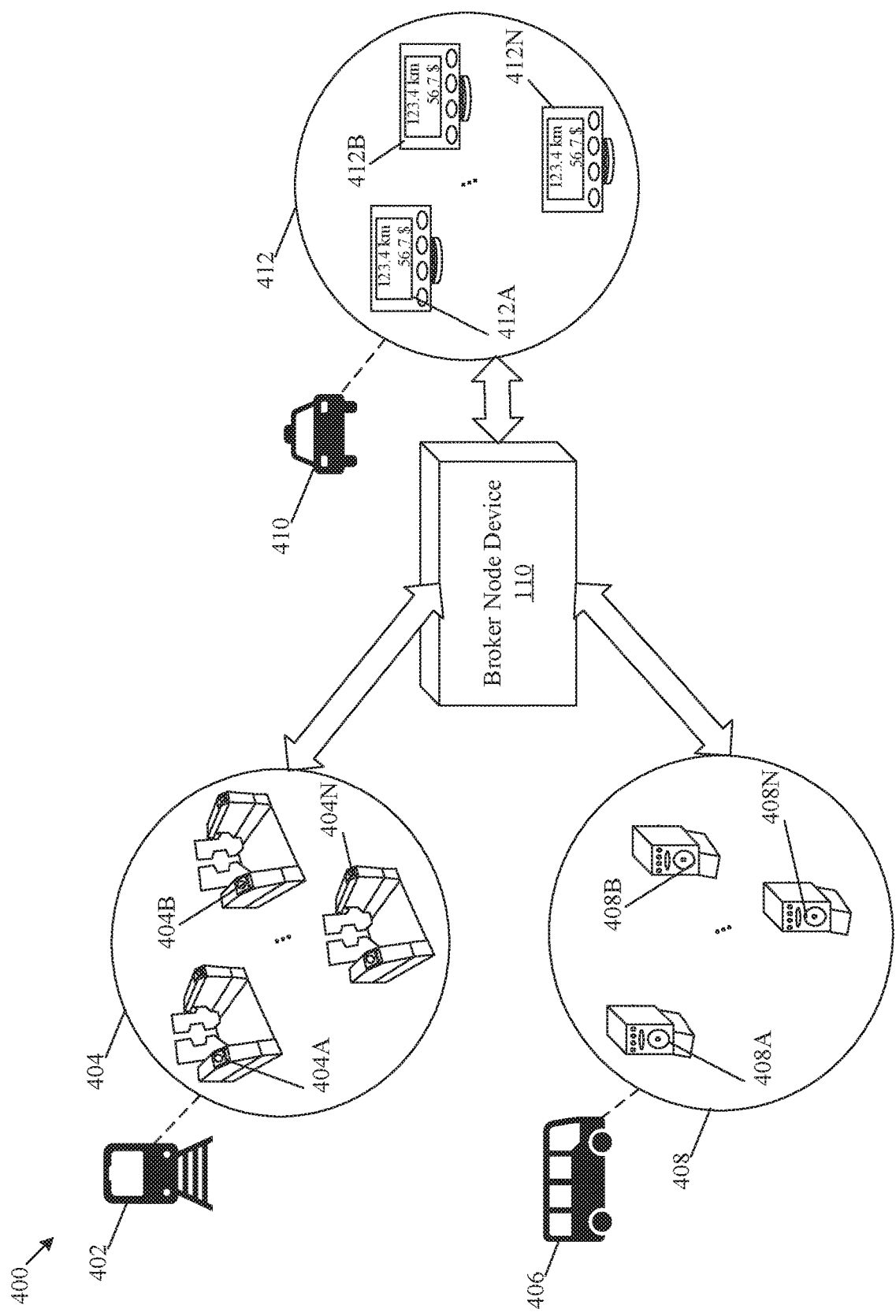
FIG. 4 is a diagram that illustrates an exemplary scenario of cluster management of publisher node devices of a plurality of transportation providers of a MaaS network, in accordance with an embodiment of the disclosure.

FIG. 4 is a diagram that illustrates an exemplary scenario of cluster management of publisher node devices of a plurality of transportation providers of a MaaS network, in accordance with an embodiment of the disclosure. FIG. 4 is explained in conjunction with elements from FIG. 1, FIG. 2, and FIG. 3. With reference to FIG. 4, there is shown an exemplary scenario 400. The exemplary scenario 400 includes the broker node device 110 that may be connected to a first plurality of publisher node devices 404, a second plurality of publisher node devices 408, and a third plurality of publisher node devices 412.

The first plurality of publisher node devices 404 may be a first cluster of ticket readers that may be associated with a first transportation provider 402 (for example, a train service provider, as shown). The first cluster of ticket readers may be installed in a corresponding cluster of ticketing gates which includes a first ticketing gate 404A, a second ticketing gate 404B, . . . and an Nth ticketing gate 404N.

The second plurality of publisher node devices 408 may be a second cluster of ticket readers that may be associated with a second transportation provider 406 (for example, a bus service provider, as shown). The second cluster of ticket readers may be installed in a corresponding cluster of ticketing PoS terminals which may include a first ticketing PoS terminal 408A, a second ticketing PoS terminal 408B, . . . and an Nth ticketing PoS terminal 408N.

The third plurality of publisher node devices 412 may be a third cluster of ticket readers that may be associated with a third transportation provider 410 (for example, a taxi or cab service, as shown). The third cluster of ticket readers may be installed in a corresponding cluster of mobile PoS devices which may include a first mobile PoS device 412A, a second mobile PoS device 412B, . . . and an Nth mobile PoS device 412N. The N number of ticketing gates, ticketing PoS terminals, and mobile PoS devices shown in FIG. 4 are merely presented as an example.

In an embodiment, a first node management device (not shown in FIG. 4) may be associated with each of the first plurality of publisher node devices 404 to manage the cluster of ticketing gates associated with the first transportation provider 402. The first node management device may be configured to monitor the first plurality of publisher node devices 404 to detect an operational failure associated with a ticket reader installed at the first ticketing gate 404A. The first node management device may determine the operational state of the first ticketing gate 404A as an inactive state based on the detection of the operational failure. In cases where the operational state of the first ticketing gate 404A is determined as inactive, the first node management device may operationalize another ticketing gate (such as the second ticketing gate 404B) in the cluster of ticketing gates as a replacement for the first ticketing gate 404A. Alternatively, a faulty ticket reader of the first ticketing gate 404A may be replaced by an operational ticket reader of the second ticket gate 404B.

In order to operationalize, the second ticketing gate 404B may be installed and setup at a ticket terminal. The second ticketing gate 404B may be setup as a backup for the first ticketing gate 404A based on a determination that the ticket reader of the first ticketing gate 404A is faulty. In some embodiments, a new hardware token device may be setup and installed in the second ticketing gate 404B. In some other embodiments, the hardware token device may be removed from the faulty ticket reader of the first ticketing gate 404A and may be installed in a ticket reader of the backup ticketing gate (i.e., the second ticketing gate 404B).

In some embodiments, the device profile of the faulty ticket reader may be transferred as a text file to the ticket reader of the second ticketing gate 404B. Such profile may include attributes, which may be required to create a transaction message. Examples of such attributes may include, but are not limited to, company code, company name, station name, station code, gate name, and gate code. The configuration and operationalization of the backup ticketing gate (i.e., the second ticketing gate 404B) as a replacement and backup for the non-operational first ticketing gate 404A is explained further, for example, in FIG. 5.

Similar to the first node management device, a second node management device (not shown) and a third node management device (not shown) may be associated with the second plurality of publisher node devices 408 and the third plurality of publisher node devices 412, respectively. The operations of the second node management device and the third node management device may be similar to that of the first node management device. By use of a respective node management device, each transportation provider may be able to backup and replace the publisher node devices associated with that transportation provider. Each of the node management devices may be configured to perform bulk configuration management and monitoring of the plurality of publisher node devices associated with the respective node management device. The operations of a node management device are described further, for example, in FIG. 5.

In an embodiment, all publisher node devices may follow set protocols (as explained in the sequence of operations from 202 to 214) to operationalize on the MaaS network 108. The set protocols may mandate a common security architecture (for publisher node device authentication and authorization), a network protocol (e.g., HTTP, MQTT, AMQP, and the like), a uniform data request or response format (e.g., JSON, CSV, or XML format), and an API/data scheme. This may ensure that each publisher node device follows a cluster-level configuration (such as a device profile including a company name, a company ID, a gate ID, a gate number, and the like) and a device-level certificate (i.e., the authentication credential). The cluster-level configuration and the set protocols may facilitate transport providers to deploy new publisher nodes or replace existing publisher nodes with a plug-and-play approach.

In some embodiments, the MaaS network 108 may include publisher node devices that may be inherently heterogeneous, i.e. device which operate using proprietary hardware/software which may be specific to a transportation provider associated with the publisher node devices. Such publisher node devices may only be capable of handling transactions of its own specific transportation provider. For example, the first cluster of ticket readers installed in the cluster of ticketing gates may be configured to use protocols and configuration which may be proprietary to the first transportation provider 402 (i.e. the train service provider). Such readers may be referred to as heterogeneous publisher node devices. In an embodiment, the MaaS network 108 may provide a plugin-based support to the publisher node devices 104A, 104B, . . . 104N such that message formats of the heterogenous publisher node devices may be converted to the message formats of a standard communication protocol associated with the MaaS network 108, which may implement a MaaS standard specification. Thus, the heterogeneous publisher node devices may also operate on the MaaS network 302 through the plugin-based support.

In some other embodiments, the MaaS network 108 may include certain homogeneous publisher node devices (such as the second plurality of publisher node devices 408 and the third plurality of publisher node devices 412). Such devices, for example, ticket readers, may be interoperable as ticket readers of multiple transportation providers. For example, certain ticket readers installed in some of the ticketing gates of the train service provider may be configured to operate as ticket readers of ticketing PoS terminals of the bus service provider or the mobile PoS devices of the taxi service. Such interoperable ticket readers may easily be replaced or removed from one terminal and installed at another terminal of same or different transportation service provider. The interoperability may be achieved by use of standard authentication methods (which use standard collect points or authentication options), standardized device configuration information, standardized communication protocols, and standardized data request/response format.

In some scenarios, the first publisher node device 104A may be required to be operationalized as a publisher node device associated with a second transportation provider. For example, if most of the trips of a first bus service provider are cancelled on a day and a second bus service provider witnesses trip bookings which exceed its ticket processing capacity, then some of the publisher nodes (such as ticket readers) of the first bus service provider on the bus stand or the bus station may be operationalized for the second bus service provider.

As an example, the cluster of ticketing PoS terminals may be associated with the first bus service provider and the second bus service provider. The first ticketing PoS terminal 408A may be leased (or owned) and operated by the first bus service provider and the second ticketing PoS terminal 408B may be leased (or owned) and operated by the second bus service provider. In case of excess ticketing demand on the second ticketing PoS terminal 408B and low (or no) ticketing demand on the first ticketing PoS terminal 408A, the first ticketing PoS terminal 408A may be operationalized as ticket processing terminal of the second bus service provider to reduce the excess ticketing demand on the second ticketing PoS terminal 408B. In another example, the cluster of mobile PoS devices may be associated with a plurality of taxi or cab services (collectively represented as the third transportation provider 410).

As another example, the first mobile PoS device 412A may be associated with a first taxi service provider and the second mobile PoS device 412B may be associated with a second taxi service provider. In case of excess ticketing demand on the second mobile PoS device 412B, the first mobile PoS device 412A may be operationalized as the ticket processing device of the second taxi service provider.

Figure 5:
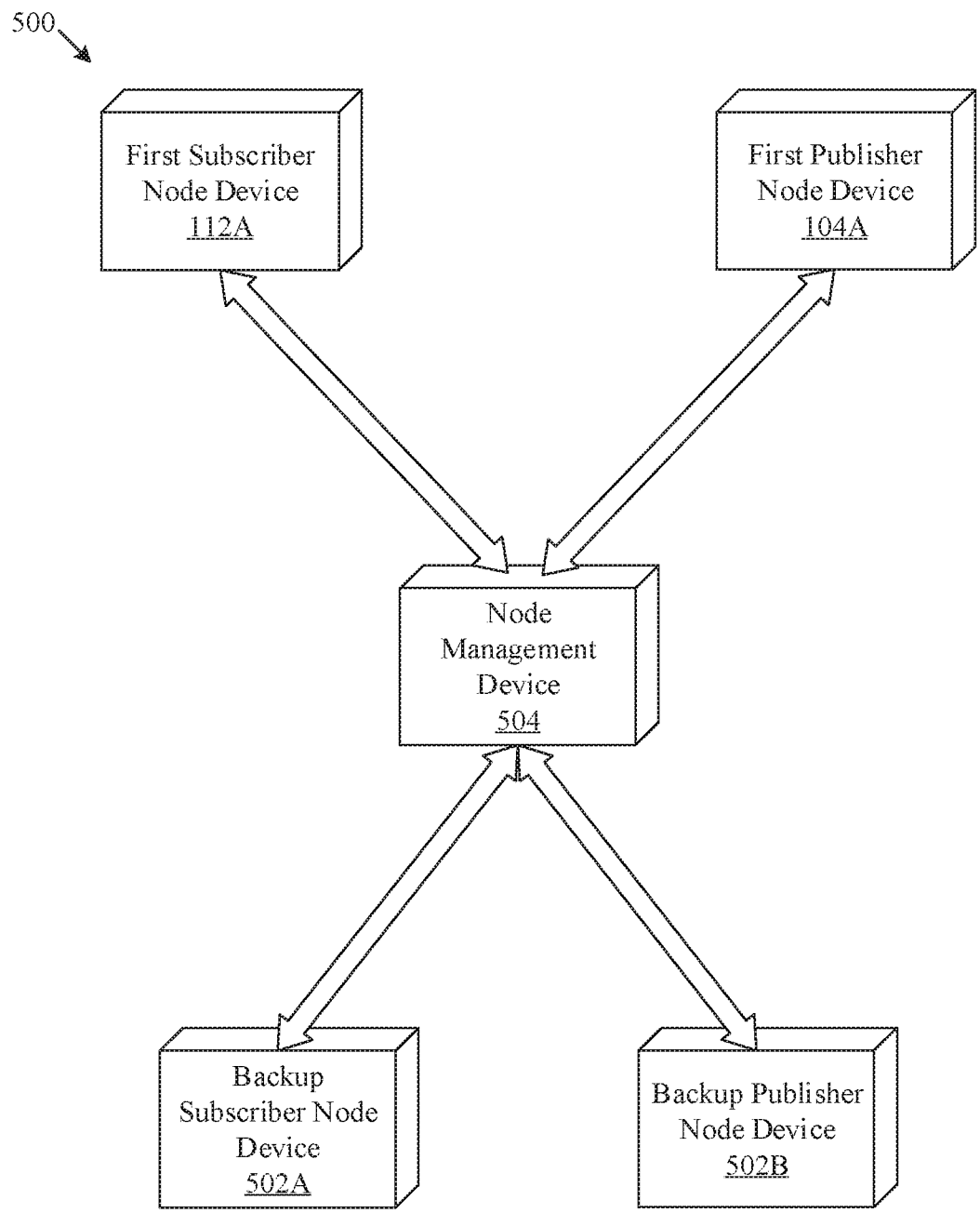
FIG. 5 is a diagram that illustrates an exemplary scenario for cluster management of publisher node devices and backup of subscriber node devices, in accordance with an embodiment of the disclosure.

FIG. 5 is a diagram that illustrates an exemplary scenario for cluster management of publisher node devices and backup of subscriber node devices, in accordance with an embodiment of the disclosure. FIG. 5 is explained in conjunction with elements from FIG. 1, FIG. 2, FIG. 3, and FIG. 4. With reference to FIG. 5, there is shown an exemplary scenario 500. The exemplary scenario 500 includes a backup subscriber node device 502A, a backup publisher node device 502B, a node management device 504, the first publisher node device 104A of the MaaS network 108, and the first subscriber node device 112A of the MaaS network 108, each of which may connect with one another through one or more communication networks. The first publisher node device 104A and the first subscriber node device 112A may be associated with the node management device 504 for the first transportation provider of the first transportation service.

The backup subscriber node device 502A may include suitable logic, circuitry, code, and/or interfaces that may be configured to operate as a backup or a replacement of any faulty or inactive subscriber node device of the MaaS network 108. The backup subscriber node device 502A may or may not be associated with any specific transportation provider of the MaaS network 108. Examples of the backup subscriber node device 502A may include, but are not limited to, a web server, an edge device, an edge node, a cloud server, a cluster of cloud-based servers, a workstation, or any computing device with a fog computing capability.

The backup publisher node device 502B may include suitable logic, circuitry, code, and/or interfaces that may be configured to operate as a backup or a replacement of any faulty or inactive publisher node device of the MaaS network 108. The backup publisher node device 502B may or may not be associated with any specific transportation provider of the MaaS network 108. Examples of the backup publisher node device 502B may include, but are not limited to, a consumer electronic device with a trip planning or booking application, a ticket reader on a ticketing gate, a ticketing kiosk, a Point-of-Sale (PoS) device, a mobile POS, a ticket vending machine, a smart door of a transport vehicle which may read a ticket to start or end a ride.

The node management device 504 may include suitable logic, circuitry, code, and/or interfaces that may be configured to monitor the first publisher node device 104A and the first subscriber node device 112A to determine an operational state of the first publisher node device 104A and the first subscriber node device 112A. In case the operational state of the first publisher node device 104A is an inactive state, the node management device 504 may be responsible for operationalization of the backup publisher node device 502B as a replacement of the first publisher node device 104A. In another case, if the operational state of the first subscriber node device 112A is an inactive state, the node management device 504 may be responsible for operationalization of the backup subscriber node device 502A as a replacement of the first subscriber node device 112A. Examples of the node management device 504 may include, but are not limited to, a mobile diagnostic computer, a web server, an edge device, an edge node, a cloud server, a cluster of cloud-based servers, a workstation, or any computing device or system with a fog computing capability.

In operation, the node management device 504 may monitor the first publisher node device 104A to detect an operational failure associated with the first publisher node device 104A. In an embodiment, the operational failure may be associated with one or more of: an authentication failure of the first publisher node device 104A, a network failure of the first publisher node device 104A, a power failure of the first publisher node device 104A, or a fault caused by a malfunctioning component associated with the first publisher node device 104A.

The node management device 504 may determine the operational state of the first publisher node device 104A as an inactive state based on the detection of the operational failure. In cases where the operational state of the first publisher node device 104A is determined as the inactive state, the node management device 504 may operationalize the backup publisher node device 502B as a replacement for the first publisher node device 104A, as described herein. In order to operationalize, the backup publisher node device 502B may be installed and setup at a ticket terminal. For example, if the first publisher node device 104A is a faulty ticket reader at the ticketing gate, then the setup of the backup publisher node device 502B may include replacement of the faulty ticket reader with the backup publisher node device 502B. In some embodiments, a new hardware token device may be installed in the backup publisher node device 502B. In some other embodiments, the hardware token device may be removed from the faulty ticket reader and installed in the backup publisher node device 502B.

To configure the backup publisher node device 502B, the node management device 504 may transfer the first device profile associated with the first publisher node device 104A to the backup publisher node device 502B. In an embodiment, the node management device 504 may also transfer the authentication credential associated with the first publisher node device 104A to the backup publisher node device 502B.

The backup publisher node device 502B may be operationalized as the replacement for the first publisher node device 104A based on the transferred first device profile and the transferred authentication credential associated with the first publisher node device 104A. For example, the node management device 504 may instruct the backup publisher node device 502B to boot-up and perform an initial network connection test based on configuration information, such as a network address, a broker node device endpoint address, and a communication protocol. After the boot-up and the initial network connection test are successful, the node management device 504 may instruct the backup publisher node device 502B to obtain authentication from the server 106 by following the sequence of operations from 202 to 206 of FIG. 2. Upon successful network connection and authentication, the backup publisher node device 502B may operate as a ticket processing client of the first transportation provider, as described in sequence of operations 208 to 214 of FIG. 2. By use of the node management device 504, a transportation provider or an administrator of the MaaS network 108 may replace faulty or inoperative publisher node devices of the MaaS network 108 and ensure business continuity of the transportation services associated with the MaaS network 108.

In some scenarios, the first publisher node device 104A may be required to be operationalized as a publisher node device associated with a second transportation provider. For example, if most of the trips of a bus service provider are cancelled on a day and a second bus service provider witnesses trip bookings which exceed its ticket processing capacity, then some of the publisher nodes (such as ticket readers) of the first bus service provider on the bus stand or the bus station may be operationalized for the second bus service provider.

The node management device 504 may transfer a second device profile associated with the second transportation provider to the first publisher node device 104A. Similar to the first device profile, the second device profile may also include a company name, a company ID, a station name, a station ID, a gate name, a gate ID, a geography, a region, or an address associated with the second transportation provider. After the transfer is complete, the node management device 504 may replace the first device profile on the first publisher node device 104A with the transferred second device profile. Thereafter, the node management device 504 may operationalize the first publisher node device 104A as the ticket processing client associated with the second transportation provider based on the transferred second device profile. For example, the node management device 504 may operationalize the first publisher node device 104A by instructing the first publisher node device 104A to obtain authentication from the server 106 as a valid ticket processing client and authorization from the server 106 to publish transaction messages to subscriber node(s). The authentication and the authorization may be performed based on execution of the sequence of operations 202 to 214, as described in FIG. 2.

In an embodiment, the node management device 504 may monitor the first subscriber node device 112A to detect an operational failure associated with the first subscriber node device 112A. In an embodiment, the operational failure may be associated with one or more of: a network failure of the first subscriber node device 112A, a power failure of the first subscriber node device 112A, or a fault caused by a malfunctioning component associated with the first subscriber node device 112A. The node management device 504 may determine the operational state of the first subscriber node device 112A as an inactive state based on the detection of the operational failure. In cases where the operational state of the first subscriber node device 112A is determined as the inactive state, the node management device 504 may operationalize the backup subscriber node device 502A as a replacement for the first subscriber node device 112A, as described herein.

In an embodiment, the node management device 504 may select and operationalize a backup subscriber node device (such as the backup subscriber node device 502A) from the subscriber node devices of the MaaS network 302 as a replacement for the inactive first subscriber node device 112A. The node management device 504 may operationalize the backup subscriber node device 502A as the replacement for the inactive first subscriber node device 112A by creation of an association between the backup subscriber node device 502A and the broker node device 110, and also the first node 304A of the distributed ledger 304. When the node management device 504 may receive a transaction message (which may be associated with a first trip plan) for the inactive first subscriber node device 112A from the broker node device 110, the node management device 504 may route the transaction message to the selected backup subscriber node device 502A for temporary storage.

In an embodiment, the node management device 504 may initialize a recovery of the inactive subscriber node device (such as the first subscriber node device 112A). For example, the node management device 504 may reboot or restart a server which hosts the inactive first subscriber node device 112A to initialize the recovery. In some cases, the node management device 504 may reinitialize/reset a network connectivity of the server, run diagnostic checks, or perform auto-repair of software associated with the inactive first subscriber node device 112A. After the recovery is complete, the node management device 504 may instruct the backup subscriber node device 502A to reroute the stored transaction message to the now recovered first subscriber node device 112A.

The MaaS network 108 may provide a plugin architecture for the publisher node devices associated with different transportation providers to join the MaaS network 108. Through the node management device 504, the MaaS network 108 may also provide bulk cluster management of the publisher node devices. All publisher node devices may follow set protocols (as explained in the sequence of operations from 202 to 214) to operationalize on the MaaS network 108. The set protocols may mandate a common security architecture (for publisher node device authentication and authorization), a network protocol (e.g., HTTP, MQTT, AMQP, and the like), a uniform data request or response format (e.g., JSON, CSV, or XML format), and an API/data scheme. This may ensure that each publisher node device follows a standard cluster-level configuration (such as a device profile including a company name, a company ID, a gate ID, a gate number, and the like) and a device-level certificate (i.e., the authentication credential). The standard cluster-level configuration and the set protocols may facilitate transport providers to deploy new publisher nodes or replace existing publisher nodes with a plug-and-play approach. This may facilitate the MaaS network 108 to function as a homogeneous transportation network with interoperability between resources (such as publisher node devices) of the various transportation providers.

In contrast, a conventional publisher node device may have a proprietary configuration (device profile or authentication credential) and proprietary connection methods to access and operationalize on the MaaS network 108. This may lead to interoperability issues with publisher node devices of other transport providers. In case of an urgent requirement, deployment of new or backup publisher node devices may take more time than required.

Figure 6A:
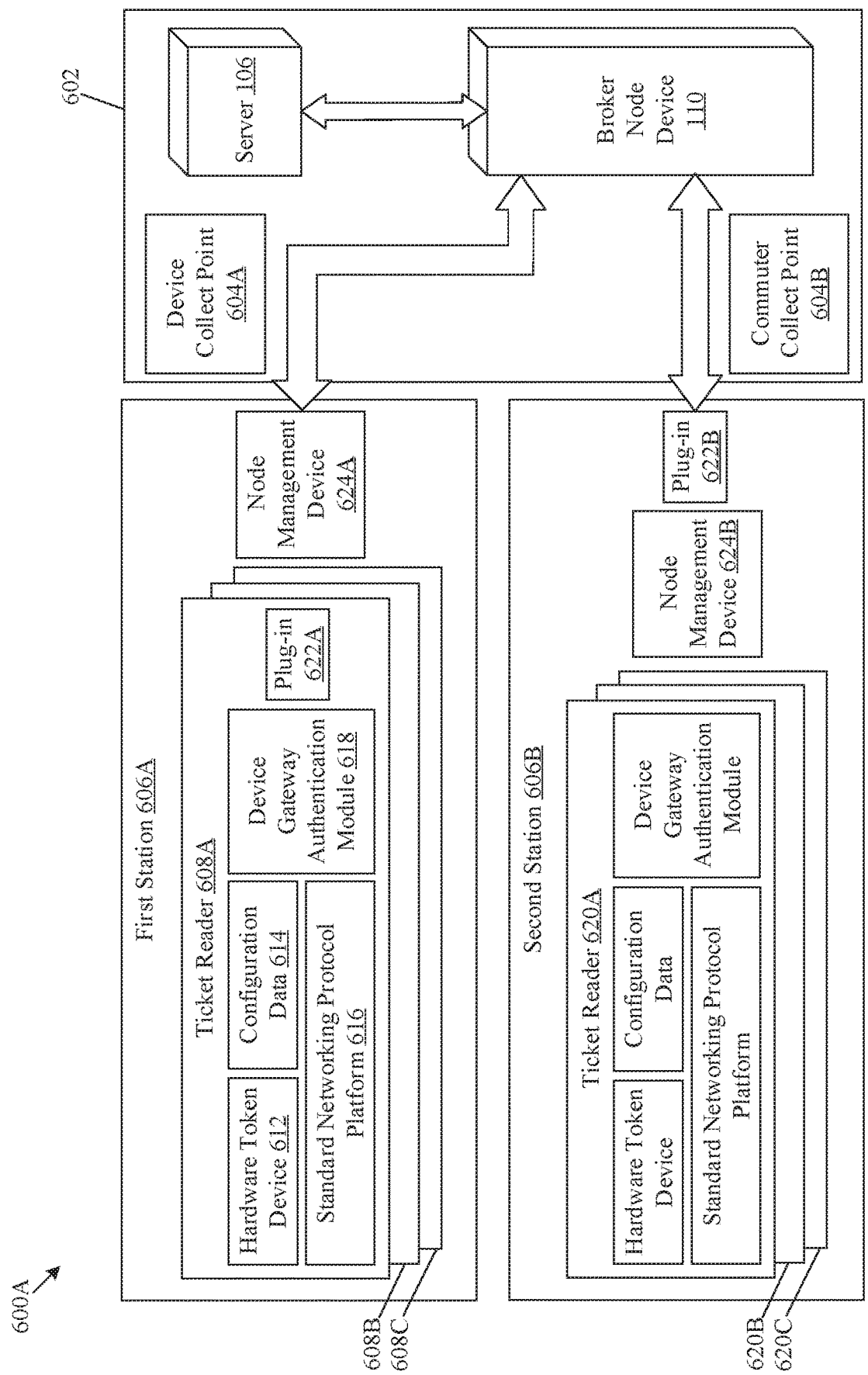
FIG. 6A is a diagram that illustrates an exemplary scenario for an intelligent broker device and associated ticket readers of a MaaS network, in accordance with an embodiment of the disclosure.

FIG. 6A is a diagram that illustrates an exemplary implementation of an intelligent broker device and associated ticket readers of a MaaS network, in accordance with an embodiment of the disclosure. FIG. 6A is explained in conjunction with elements from FIG. 1, FIG. 2, FIG. 3, FIG. 4, and FIG. 5. With reference to FIG. 6A, there is shown an exemplary implementation 600A. The exemplary implementation 600A may include an intelligent broker device 602, a first station 606A, and a second station 606B of a transportation provider (for example, the first transportation provider 402). The intelligent broker device 602 may include the server 106 and the broker node device 110 communicatively coupled to the server 106. The intelligent broker device 602 may further include a device collect point 604A and a commuter collect point 604B.

The first station 606A may include a ticket reader 608A, a ticket reader 608B, and a ticket reader 608C. The second station 606B may include a ticket reader 620A, a ticket reader 620B, and a ticket reader 620C. The first station 606A may include a node management device 624A for the ticket readers 608A, 608B, and 608C of the first station 606A. The second station 606B may include a node management device 624B and a plug-in 622B for the ticket readers 620A, 620B, and 620C. The functions of the node management device 624A and the node management device 624B may be same as the functions of the node management device 504 described, for example, in FIG. 5. Therefore, the description of the node management devices 624A and 624B is omitted from the disclosure for the sake of brevity.

In an embodiment, in a first scenario, a node management device may be implemented for each publisher node device (i.e., ticket reader) of a station, such as, in the case of the node management device 624A associated with the ticket reader 608A of the first station 606A. In a second scenario, a node management device may be implemented on a per station basis, such as in the case of the node management device 624B associated with the second station 606B. In another scenario, the server 106 may manage a node management device (e.g., the node management device 504) and may be a part of the intelligent broker device 602.

Each of the ticket readers 608A, 608B, and 608C and each of the ticket readers 620A, 620B, and 620C may connect to the broker node device 110 through one or more communication networks. Also, each of the ticket readers 608A, 608B, and 608C and each of the ticket readers 620A, 620B, and 620C is an exemplary implementation of a publisher node device of FIG. 1. The number of the ticket readers in FIG. 6 are merely presented as an example. Each of the first station 606A and the second station 606B may include any number of ticket readers, without a deviation from the scope of the disclosure. For the sake of brevity, only three ticket readers are shown at each of the first station 606A and the second station 606B.

The intelligent broker device 602 may include suitable logic, circuitry, code, and/or interfaces that may be configured to authenticate devices as valid ticket processing clients. For example, such devices may include ticket readers, such as the ticket readers 608A, 608B, and 608C and the ticket readers 620A, 620B, and 620C. The intelligent broker device 602 may also authenticate transaction messages sent from the ticket readers to the broker node device 110 and/or authorize the broker node device 110 to route such transaction messages to appropriate subscriber nodes of the MaaS network 108. Example implementations of the intelligent broker device 602 may include, but are not limited to, an application server, a cloud server, a mainframe server, a database server, a web server, or other type of servers.

The device collect point 604A may allow devices (such as the ticket reader 608A) which use one of a network-based authentication option or a certificate-based authentication option to obtain authentication from the server 106. The network-based authentication option may use a network ID associated with a hardware token device and the certificate-based authentication option may use a client certificate issued to the ticket reader. The intelligent broker device 602 may add new collect points for other features, such as user preferences for audio or video content), add new network IDs, or issue new client certificates to ticket readers or remove existing network IDs or client certificates.

The commuter collect point 604B may include a subscription option for a user (e.g., the user 306) of the ticket reader (such as the ticket reader 608A). The commuter collect point 604B may enable authentication of a user (e.g., the user 306) to use different routes of different transportation providers based on a subscription of the user with the different transportation providers. The commuter collect point 604B may use a subscription ID of a user to allow ticket readers (such as the ticket reader 608A) to support a subscription model of MaaS. When a subscribed member (such as the user 306) wants to make use of different routes using different transport providers, then the subscription ID may be used for ticketing requests from the ticket readers spread across multiple transportation service providers. In certain scenarios, the subscription model may also support subscription-based access to collect points, such as user preferences for audio, video, or other multimedia content. Such access may be based on user's subscription to services offered by the MaaS. The intelligent broker device 602 may add new subscription models or remove existing subscription models for users and transportation providers in the commuter collect point 604B to add or remove service mappings of users and transportation providers of the MaaS network 302.

The ticket reader 608A may include suitable logic, circuitry, code, and/or interfaces that may be configured to capture a ticket processing event at a station based on a scan of a non-electronic ticket or an electronic ticket. Examples of the electronic ticket may include, but are not limited to, an Integrated Circuit (IC) card, a chip card, a smart card, a contactless card, a Near-Field Communication (NFC)-based card, a bar coded card, a Quick-Response coded card associated with the first transportation provider 402. The non-electronic ticket may include digital codes, patterns, symbols, or passcodes which may be scanned or manually entered on a user interface associated with the ticket reader 608A. The ticket reader 608A may include a hardware token device 612, configuration data 614, a standard networking protocol platform 616, and a device gateway authentication module 618. The ticket reader 608A may further include a plug-in 622A.

The hardware token device 612 may include suitable logic, circuitry, interfaces, and/or code that may be configured to operate a hardware token for the ticket reader 608A. The hardware token may include secret information which may act as an authentication credential for the ticket reader 608A. The ticket reader 608A may use the hardware token to request authentication or authorization from the server 106. Examples of the hardware token may include, but are not limited to, SIM card, an embedded Universal Integrated Circuit Card (eUICC), or a chip which generates digital passcodes or secure PINs.

In an embodiment, the hardware token device 612 may be physically inserted into a predefined slot in the ticket reader 608A or may be physically attached to the ticket reader 608A. The hardware token device 612 may be configured to store the device-level certificate (i.e., the authentication credential) associated with the ticket reader 608A. Examples of the authentication credential may include, but is not limited to, a device ID, a network ID, or a client certificate associated with the first publisher node device 104A.

In another embodiment, the hardware token device 612 may be a Subscriber Identity Module (SIM) or a smart card associated with the MaaS network 302 or the first transportation provider. The SIM or the smart card may store the authentication credential and may generate a unique identifier or a random number as the authentication credential. The unique identifier and/or the authentication credential may be used by the server 106 for authentication and/or authorization of the first publisher node device 104A to operate as a ticket processing client of the first transportation provider and/or transmit transaction messages to devices registered on the MaaS network 302.

The configuration data 614 may include the cluster-level configuration (such as a device profile including a company name, a company ID, a gate ID, a gate number, and the like) associated with the ticket reader 608A. The configuration data 614 may be used by a node management device (e.g., the node management device 624A) associated with the ticket reader 608A to configure the ticket reader 608A or other ticket readers of the same transportation service provider or a different transportation service provider. Further, the configuration data 614 may be used by the node management device (e.g., the node management device 624A) associated with the ticket reader 608A to operationalize a backup ticket reader as replacement of the ticket reader 608A in case a failure of the ticket reader 608A is detected by the node management device (e.g., the node management device 624A).

The standard networking protocol platform 616 may correspond to an open standard specification-based communication protocol for MaaS. Publisher node devices (e.g., ticket readers or sensor devices) of different companies associated with various transportation providers of the MaaS network 302 may join the MaaS network 302 as homogeneous publisher node devices. Additionally, legacy ticket readers or sensor devices may connect to the MaaS network 302 based on leverage of standard communication protocols, such as, HTTP, MQTT or AMQP. By use of standard communication protocols, the MaaS network 302 may provide ticket roaming functionality to users.

The device gateway authentication module 618 may include suitable logic, circuitry, interfaces, and/or code that may be configured to transmit a request for authentication of the ticket reader 608A to the server 106 associated with the intelligent broker device 602. In some embodiments, the device gateway authentication module 618 may be configured to generate an authorization request associated with the transaction message. The device gateway authentication module 618 may be configured to transmit the authorization request to the broker node device 110, which may transmit the authorization request to the server 106 to seek for authorization to route the transaction message to devices (e.g., subscriber nodes) of the MaaS network 302.

Each of the plug-ins 622A and 622B may include suitable logic, circuitry, interfaces, and/or code that may be configured to convert transaction messages of the ticket readers of the first station 606A and the second station 606B, respectively, to a standard message format that may be compatible with a MaaS standard specification that may be followed by the MaaS network 302. For example, the first publisher node device 104A may be associated with a plug-in module (e.g., the plug-in 622A) that may be configured to convert the transaction message from a message format associated with the first publisher node device 104A to a message format associated with the MaaS network 302.

In the first scenario, the plug-in 622A may be implemented as a software component of the ticket reader 608A and may be coupled to the device gateway authentication module 618. The plug-in 622A may be similarly implemented as a software component of the other ticket readers 608B and 608C of the first station 606A. In the first scenario, the plug-in 622A may convert input transaction messages from the respective ticket readers and send converted output transaction messages to the node management device 624A that may send the converted transaction messages as output transaction messages to the broker node device 110.

In the second scenario, the plug-in 622B may be implemented as a software common to all ticket readers of the second station 606B and may be coupled to the node management device 624B. The plug-in 622B may convert transaction messages associated with each of the ticket readers 620A, 620B, and 620C received from the node management device 624B and send the converted transaction messages to the broker node device 110.

While in the first scenario, a plug-in (the plug-in 622A) may be implemented in each ticket reader (e.g., the ticket reader 608A) of a station (e.g., the first station 606A) and coupled to a device gateway (e.g., the device gateway authentication module 618) of the ticket reader, a plug-in (e.g., the plug-in 622B) in the second scenario may be implemented as a common gateway outside the ticket readers of a station (e.g., the second station 606B). The plug-ins 622A and 622B may include suitable logic, code, and interfaces to transaction messages in proprietary or mobility provider specific formats to transaction messages in message formats compatible with the MaaS standard specification (that may be supported by the MaaS network 302).

Similar to the ticket reader 608A, both the ticket reader 608B and the ticket reader 608C may include the hardware token device 612, the configuration data 614, the standard networking protocol platform 616, and the device gateway authentication module 618. Further, each of the ticket readers 620A, 620B, and 620C may include hardware token device, configuration data, standard networking protocol platform, and device gateway authentication module, each of which may be similar to their counterparts included in the ticket reader 608A.

Figure 6B:
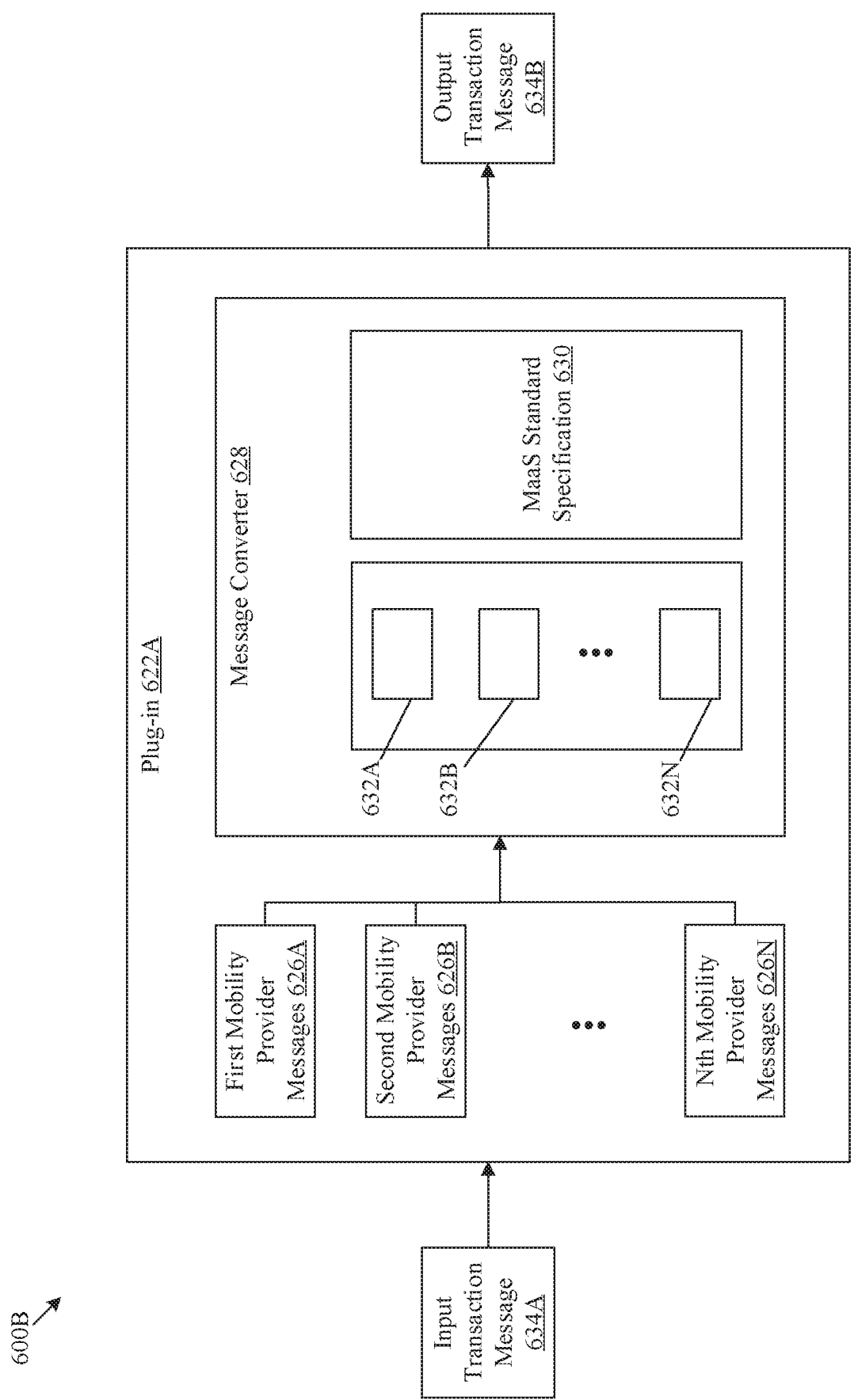
FIG. 6B is a diagram that illustrates an exemplary scenario for a plug-in for conversion of message formats of transaction messages of publisher node devices to a standard transaction message format of a MaaS network, in accordance with an embodiment of the disclosure.

FIG. 6B is a diagram that illustrates an exemplary scenario for a plug-in for conversion of message formats of transaction messages of publisher node devices to a standard transaction message format of a MaaS network, in accordance with an embodiment of the disclosure. FIG. 6B is explained in conjunction with elements from FIG. 1, FIG. 2, FIG. 3, FIG. 4, FIG. 5, and FIG. 6A. With reference to FIG. 6B, there is shown an exemplary scenario 600B. The exemplary scenario 600B may include the plug-in 622A, an input transaction message 634A, and an output transaction message 634B. The plug-in 622A may include first mobility provider messages 626A, second mobility provider messages 626B, . . . Nth mobility provider messages 626N. Further, the plug-in 622A may include a message converter 628 that may include a MaaS standard specification 630. The message converter 628 may further include Application Programming Interfaces (APIs) associated with mobility providers, such as a first API 632A associated with a first mobility provider, a second API 632B associated with a second mobility provider, . . . and an Nth API 632N associated with an Nth mobility provider.

The N number of mobility providers and associated messages and APIs shown in FIG. 6B is presented merely as an example. FIG. 6B may be implemented for only two mobility providers and associated messages and APIs or more than N mobility providers and associated messages and APIs, without deviation from the scope of the disclosure. For the sake of brevity, only N mobility providers and associated messages and APIs have been shown in FIG. 6B. However, in some embodiments, there may be more than N mobility providers and associated messages and APIs, without limiting the scope of the disclosure.

Each of the first mobility provider messages 626A, the second mobility provider messages 626B, . . . and the Nth mobility provider messages 626N may correspond to message queues that may be configured to store transaction messages that the plug-in 622A may receive from the ticket readers of respective mobility providers. Accordingly, each of the first mobility provider messages 626A, the second mobility provider messages 626B, . . . and the Nth mobility provider messages 626N may be in a proprietary message format or a mobility provider specific format of a respective mobility provider.

The message converter 628 may include suitable logic, circuitry, code, and/or interfaces that may be configured to convert transaction messages of the respective mobility providers that may be in proprietary message format or mobility provider specific format, to a message format compatible with the MaaS network 302. In an embodiment, to convert the transaction message of a mobility provider to a message format of the MaaS network 302, the message converter 628 may use an API associated with the mobility provider and the MaaS standard specification 630. For example, the plug-in 622A may receive a transaction message (e.g., the input transaction message 634A) from the ticket reader 608A, which may be associated with the first mobility provider. In such a case, the plug-in 622A may store the received transaction message in a message queue associated with the first mobility provider messages 626A. The message converter 628 may receive the transaction message from the message queue associated with the first mobility provider messages 626A and use the first API 632A associated with the first mobility provider and the MaaS standard specification 630 to convert the transaction message from a message format of the first mobility provider to transaction message (e.g., the output transaction message 634B) compatible with the MaaS network 302. Examples of the message converter 628 may include, a software module, an application, a server, or any computing device configured to convert message formats of transaction messages from proprietary or mobility provider specific formats to message formats compatible with the MaaS standard specification that may be supported by the MaaS network 302.

Each of the first API 632A, the second API 632B, . . . and the Nth API 632N may include suitable code, logic, and/or interfaces that may be configured to decapsulate and parse a transaction message of the respective mobility provider and extract the transaction data and/or metadata from the transaction message. Each API may then provide the extracted information to the message converter 628 for further processing based on the MaaS standard specification 630. For example, the first API 632A may extract transaction data and/or metadata from the input transaction message 634A of the ticket reader 608A associated with the first mobility provider and share the extracted transaction data and/or the metadata with the message converter 628 for further processing and conversion to the output transaction message 634B. For example, each API may be hosted on or exposed by a server or application of the respective mobility provider.

The MaaS standard specification 630 may include suitable code, logic, and/or interfaces that may be configured to provide an open and common communication protocol for data exchange between the different nodes of the MaaS network 302. The MaaS standard specification 630 may include master configuration data associated with the MaaS network 302. The master configuration data may include set protocols that may mandate a common security architecture (for publisher node device authentication and authorization), a network protocol (e.g., HTTP, MQTT, AMQP, and the like), a uniform data request or response format (e.g., JSON, CSV, or XML format), and an API/data scheme. In an embodiment, the MaaS network 302 may implement the MaaS standard specification 630 for communication of transaction messages between the various nodes of the MaaS network 302.

The MaaS network 302 may include certain homogeneous publisher node devices that may support the MaaS standard specification 630. The MaaS network 302 may further include certain other publisher node devices that may not as such support the MaaS standard specification 630 but may connect to the MaaS network 302 through a plug-in (e.g., the plug-in 622A). The master configuration data may be parameterized for the different mobility providers such that the message converter 628 may generate transaction messages for each individual mobility provider based on the extracted transaction data and/or metadata received from the respective APIs of the mobility providers.

The functions of the plug-in 622B may be same as the functions of the 622A described, for example, in FIG. 6B. Therefore, the description of the plug-in 622B is omitted from the disclosure for the sake of brevity.

Figure 7:
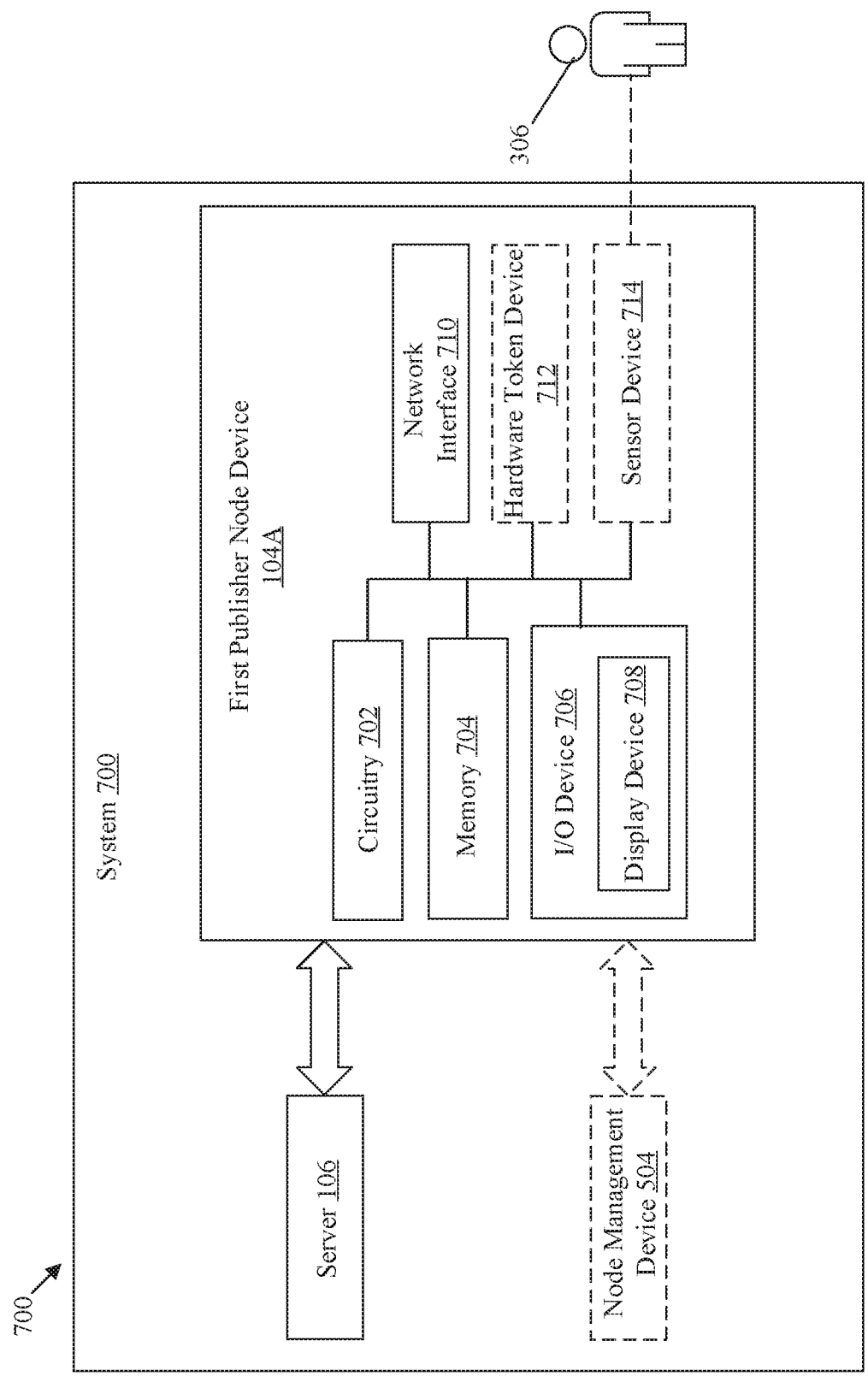
FIG. 7 is a block diagram of a system for management and secure access of a publisher node device to a MaaS network, in accordance with an embodiment of the disclosure.

FIG. 7 is a block diagram of a system for management and secure access of a publisher node device to a MaaS network, in accordance with an embodiment of the disclosure. FIG. 7 is explained in conjunction with elements from FIGS. 1, 2, 3, 4, 5, 6A, and 6B. With reference to FIG. 7, there is shown a block diagram of a system 700, which is an exemplary implementation of the system 102 of FIG. 1. The system 700 may include the first publisher node device 104A and the server 106. In some embodiments, the system 700 may also include the node management device 504 for management of the first publisher node device 104A. The server 106 and the node management device 504 may be communicatively coupled to the first publisher node device 104A.

The first publisher node device 104A may include circuitry 702, a memory 704, an input/output (I/O) device 706, a display device 708, and a network interface 710. In some embodiments, the first publisher node device 104A may also include a hardware token device 712. In some other embodiments, the hardware token device 712 may be separate from the first publisher node device 104A and may communicate the first publisher node device 104A, via the network interface 710. In certain embodiments, the first publisher node device 104A may further include a sensor device 714. In certain other embodiments, the sensor device 714 may be separate from the first publisher node device 104A and may communicate with the first publisher node device 104A, via the network interface 710. In FIG. 7, there is further shown a user (e.g., the user 306) who may interact with the sensor device 714 and may provide user inputs through the sensor device 714.

The circuitry 702 may be configured to communicate with the server 106 and the node management device 504 by use of the network interface 710. The circuitry 702 may further use the network interface 710 to communicate with the broker node device 110 (as shown in FIG. 1). The circuitry 702 may include suitable logic, circuitry, interfaces, and/or code that may be configured to execute instructions for operations to be executed by the first publisher node device 104A. Examples of implementation of the circuitry 702 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 704 may include suitable logic, circuitry, code, and/or interfaces that may be configured to store the instructions executable by the circuitry 702. The memory 704 may also store the first device profile associated with the first publisher node device 104A and a log which includes an operational state of the first publisher node device 104A at various time-instants. Examples of implementation of the memory 704 may include, but are not limited to, Random Access Memory (RAM), Read Only Memory (ROM), Hard Disk Drive (HDD), and/or a Secure Digital (SD) card.

The I/O device 706 may include suitable logic, circuitry, and/or interfaces that may be configured to receive an input and provide an output based on the received input. The I/O device 706 may include various input and output devices, which may be configured to communicate with the circuitry 702. Examples of the I/O device 706 may include, but are not limited to, a touch screen, a keyboard, a mouse, a joystick, a display device (e.g., the display device 708), a microphone, or a speaker.

The display device 708 may include suitable logic, circuitry, and interfaces that may be configured to display output associated with the first publisher node device 104A. The display device 708 may be a touch screen which may enable a user to provide a user-input via the display device 708. The display device 708 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 708 may refer to a display screen of a head mounted device (HMD), a smart-glass device, a see-through display, a projection-based display, an electro-chromic display, or a transparent display.

The network interface 710 may include suitable logic, circuitry, interfaces, and/or code that may be configured to enable communication between the first publisher node device 104A, the server 106, and the node management device 504, via one or more communication networks (not shown). The network interface 710 may further enable communication between the first publisher node device 104A and the broker node device 110 (not shown in FIG. 7). The network interface 710 may implement known technologies to support wired or wireless communication with the one or more communication networks.

The network interface 710 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 710 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The hardware token device 712 may include suitable logic, circuitry, interfaces, and/or code that may be configured to operate a hardware token for the first publisher node device 104A. The hardware token may include secret information which may act as an authentication credential for the first publisher node device 104. The first publisher node device 104A may use the hardware token to request authentication or authorization from the server 106. In an embodiment, the first publisher node device 104A may transmit the request to the server 106 using transport layer security (TLS) and one or more encryption techniques to handle security threats associated with a network communication with the server 106. Examples of the hardware token may include, but are not limited to, sim card, an embedded Universal Integrated Circuit Card (eUICC), or a chip which generates digital passcodes or secure PINs.

In an embodiment, the hardware token device 712 may be physically inserted into a predefined slot in the first publisher node device 104A or may be physically attached to the first publisher node device 104A. The hardware token device 712 may include the authentication credential associated with the first publisher node device 104A. Examples of the authentication credential may include, but is not limited to, a device ID, a network ID, or a client certificate associated with the first publisher node device 104A.

In another embodiment, the hardware token device 712 may be a Subscriber Identity Module (SIM) or a smart card associated with the MaaS network 108 or the first transportation provider. The SIM or the smart card may store the authentication credential and may generate a unique identifier or a random number as the authentication credential. The unique identifier and/or the authentication credential may be used by the server 106 for authentication and/or authorization of the first publisher node device 104A to operate as a ticket processing client of the first transportation provider and/or transmit transaction messages to the MaaS network 108, respectively.

The sensor device 714 may include suitable code, logic, circuitry, and/or interfaces that may be configured to scan a non-electronic ticket or an electronic ticket, such as an Integrated Circuit (IC) card, a chip card, a smart card, a contactless card, a Near-Field Communication (NFC)-based card, a bar coded card, a Quick-Response (QR)-coded card associated with the first transportation provider. In an example, the sensor device 714 may correspond to a FeliCa contactless IC card scanner device. The non-electronic ticket may include digital codes, patterns, symbols, or passcodes which may be scanned or manually entered on a user interface by the user 306. Examples of the sensor device 714 may include, but are not limited to, an IC card reader, a chip card reader, a smart card reader, a contactless card reader, an NFC-based card reader, a bar coded card reader, a QR-coded card reader, or a non-electronic ticket scanner or interface.

Similar to the first publisher node device 104A, each of the server 106 and the node management device 504 may include one or more components including a circuitry, a memory, a I/O device, a display device, and a network interface, with similar functions. The functions or operations executed by the first publisher node device 104A, as described in FIGS. 1, 2, 3, 4, 5, 6A, 6B, and 8, may be performed by the circuitry 702. Operations executed by the circuitry 702 are described in detail, for example, in FIGS. 1, 2, 3, 4, 5, 6A, 6B, and 8.

Figure 8:
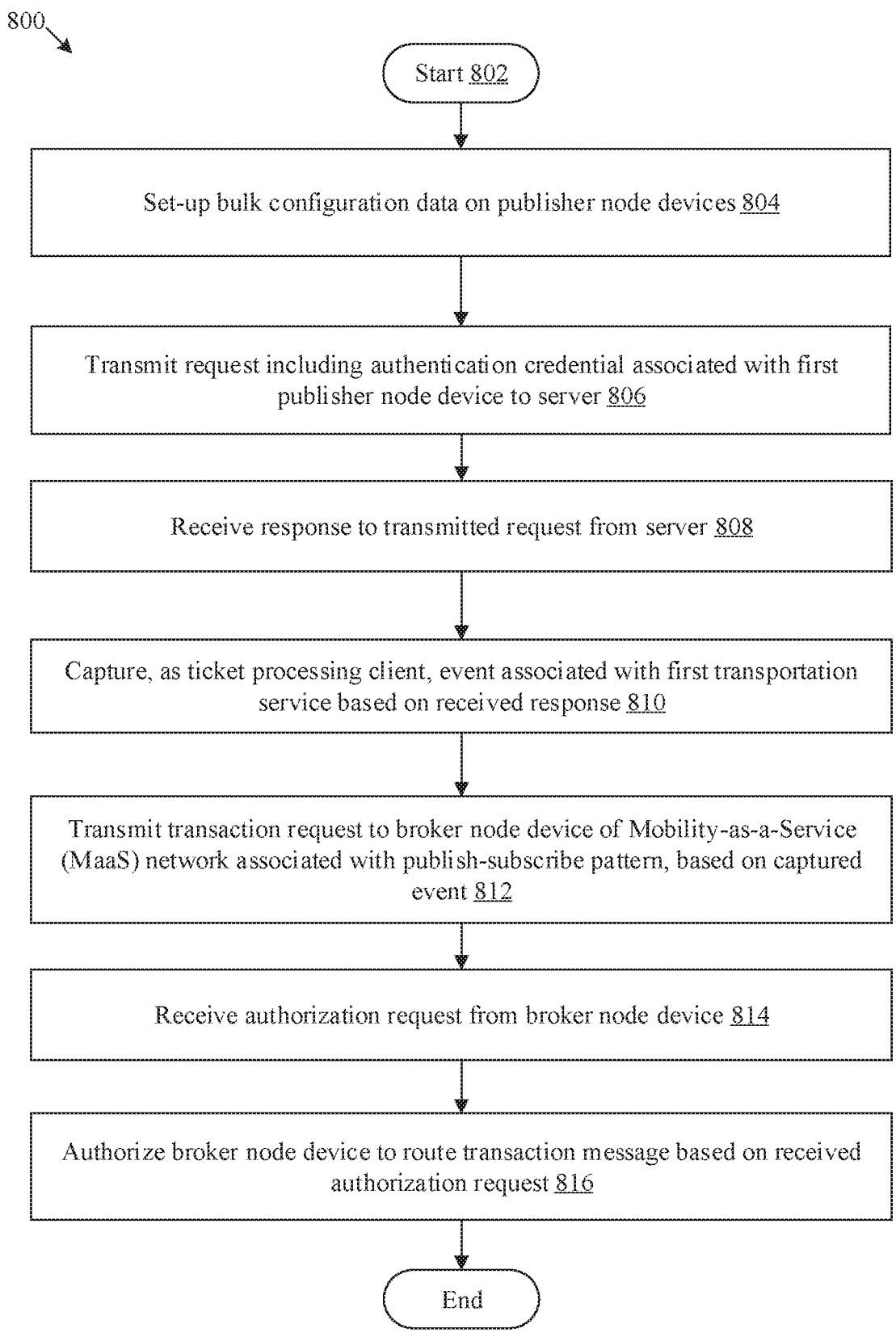
FIG. 8 is a flowchart that illustrates an exemplary method for access management of a publisher node device for secure access to a MaaS network, in accordance with an embodiment of the disclosure.

FIG. 8 is a flowchart that illustrates an exemplary method for access management of a publisher node device for secure access to a MaaS network, in accordance with an embodiment of the disclosure. FIG. 8 is described in conjunction with elements from FIGS. 1, 2, 3, 4, 5, 6A, 6B, and 7. With reference to FIG. 8, there is shown a flowchart 800. The exemplary method of the flowchart 800 may be executed by any computing system, for example, by the system 102 of FIG. 1. The exemplary method of the flowchart 800 may start at 802 and proceed to 804.

At 804, bulk configuration data may be set-up on the plurality of publisher node devices 104A, 104B, . . . 104N. In an embodiment, the node management device 504 may be configured to perform a bulk set-up of the configuration data associated with the plurality of publisher node devices 104A, 104B, . . . 104N on the respective publisher node devices. In an embodiment, the bulk set-up of the configuration data may correspond to a set-up of a cluster-level configuration on each publisher node device (i.e., a ticket reader) of a station. The cluster-level configuration may include device profile including, but not limited to, a company name, a company ID, a station name, a station ID, a gate name, a gate ID, a geography, a region, or an address of the publisher node device.

At 806, the request including the authentication credential associated with the first publisher node device 104A may be transmitted to the server 106. In an embodiment, the first publisher node device 104A may be configured to transmit the request to the server 106 to seek authentication to operate as the ticket processing client for the first transportation service.

At 808, the response to the transmitted request may be received from the server 106. The response may include authentication of the first publisher node device 104A as the ticket processing client for the first transportation service. In an embodiment, the first publisher node device 104A may be configured to receive the response from the server 106. Details related to the authentication of the first publisher node device 104A are describer further, for example, in FIG. 2.

At 810, an event associated with the first transportation service may be captured based on the received response. In an embodiment, the first publisher node device 104A may be configured to capture the event associated with the first transportation service as the ticket processing client. The capture of the event is described further, for example, in FIGS. 2 and 3.

At 812, the transaction request may be transmitted to the broker node device 110 of the MaaS network 108 based on the captured event. The transaction request may include a transaction message and an authorization request to route the transaction message to a first subscriber node device of the MaaS network 108. In an embodiment, the first publisher node device 104A may be configured to transmit the transaction request to the broker node device 110. The broker node device 110 may be configured to receive the transaction request from the first publisher node device 104A and seek authorization from the server 106 to route the transaction message to one or more subscriber node devices (e.g., the first subscriber node device 112A) of the MaaS network 108. The broker node device 110 may transmit the authorization request to the server 106 to seek authorization from the server 106.

At 814, the authorization request from the broker node device 110 may be received. In an embodiment, the server 106 may be configured to receive the authorization request from the broker node device 110. The authorization request may include the first device profile and the authentication credential associated with the first publisher node device 104A.

At 816, the broker node device 110 may be authorized to route the transaction message based on the authorization request. In an embodiment, the server 106 may be configured to authorize the broker node device 110 to route the transaction message. Based on the validation of the first device profile and/or the verification of the authentication credential, the server 106 may instruct the broker node device 110 to route the transaction message included in the transaction request to an appropriate subscriber node device (such as the first subscriber node device 112A). In one embodiment, the server 106 may validate the first device profile based on a search within a stored whitelist of device profiles associated with various transport providers. For example, one or more of the company name, the company ID, the station name, the station ID, the gate name, the gate ID, the geography, the region, or the address associated with the first publisher node device 104A may be searched individually or as a combined string in the stored whitelist of device profiles to validate the first device profile. In another embodiment, the server 106 may verify that the authentication credential associated with the first publisher node device 104A is valid and the first publisher node device 104A corresponds to a whitelisted publisher node device of the first transportation provider and the MaaS network 108. Thus, the server 106 may authenticate the first publisher node device 104A based on the authentication credentials (i.e., device-level certificate) and the first device profile (i.e., cluster-level configuration) of the first publisher node device 104A. Further, the server 106 may authenticate the transaction message to be routed by the broker node device 110 to the MaaS network 108 based on the authentication credentials and the first device profile. The authorization of the broker node device 110 is explained further, for example, in FIGS. 2 and 3. Control may pass to end.

Although the flowchart 800 is illustrated as discrete operations, such as 804, 806, 808, 810, 812, 814, and 816 the disclosure is not so limited. Accordingly, in certain embodiments, such discrete operations may be further divided into additional operations, combined into fewer operations, or eliminated, depending on the particular implementation without detracting from the essence of the disclosed embodiments.

Exemplary aspects of the disclosure may include a system (such as the system 102) that may include a server (such as the server 106) and a first publisher node device (such as the first publisher node device 104A). The first publisher node device 104A may be configured to transmit a request that may include authentication credential associated with the first publisher node device 104A to the server 106. The first publisher node device 104A may be further configured to receive a response to the transmitted request from the server 106. The response may include authentication of the first publisher node device 104A as a ticket processing client for a first transportation service. The first publisher node device 104A may be configured to capture, as the ticket processing client, an event associated with the first transportation service based on the received response. The first publisher node device 104A may be configured to transmit, based on the captured event, a transaction request to a broker node device (such as the broker node device 110) of a MaaS network (such as the MaaS network 108) associated with a publish-subscribe pattern. The transaction request may include a transaction message and an authorization request to route the transaction message to a first subscriber node device (such as the first subscriber node device 112A) of the MaaS network 108. The server 106 may be configured to receive the authorization request from the broker node device 110. The server 106 may be further configured to authorize the broker node device 110 to route the transaction message based on the received authorization request.

In an embodiment, the server 106 may be further configured to receive, from the first publisher node device 104A, the request including the authentication credential associated with the first publisher node device 104A. The server 106 may authenticate the first publisher node device 104A based on the authentication credential associated with the first publisher node device 104A. Further, the server 106 may be configured to transmit, to the first publisher node device 104A, the response for the received request based on the authentication of the first publisher node device 104A.

In an embodiment, the authorization request may include a first device profile associated with the first publisher node device 104A and the authentication credential. The server 106 may be further configured to receive the first device profile and the authentication credential from the broker node device 110. The server 106 may authorize the broker node device 110 to route the transaction message based on the received first device profile and the authentication credential.

In an embodiment, the first device profile may include, but is not limited to, at least one of a company name, a company ID, a station name, a station ID, a gate name, a gate ID, a geography, a region, or an address associated with the first publisher node device 104A. The authentication credential may include, but are not limited to, at least one of a device ID, a network ID, or a client certificate associated with the first publisher node device 104A.

In an embodiment, the first publisher node device 104A may be further configured to receive a user input including a selection of an authentication option as one of a network-based authentication option or a certificate-based authentication option. The first publisher node device 104A may select the authentication credential based on the selected authentication option in the received user input.

In an embodiment, the first publisher node device 104A may be further configured to read an electronic ticket issued to a user for the first transportation service. The first publisher node device 104A may capture the event based on the reading of the electronic ticket.

In an embodiment, the first publisher node device 104A may be associated with a node management device (e.g., the node management device 504) for a first transportation provider of the first transportation service. The node management device may be configured to transfer a second device profile associated with a second transportation provider to the first publisher node device 104A. The node management device 504 may replace, on the first publisher node device 104A, the first device profile associated with the first transportation provider with the transferred second device profile. The node management device 504 may operationalize the first publisher node device 104A as the ticket processing client associated with the second transportation provider based on the replacement.

In an embodiment, the node management device 504 may be further configured to detect an operational failure associated with one or more of an authentication failure of the first publisher node device 104A, a network failure of the first publisher node device 104A, a power failure of the first publisher node device 104A, or a fault caused by a malfunctioning component associated with the first publisher node device 104A. The node management device 504 may determine an operational state of the first publisher node device 104A as an inactive state based on the detection. In an embodiment, the node management device 504 may be further configured to transfer the authentication credential and the first device profile associated with the first publisher node device 104A to a backup publisher node device (such as the backup publisher node device 502B) based on a determination that determined operational state is the inactive state. The node management device 504 may operationalize the backup publisher node device 502B as a replacement for the first publisher node device 104A based on the transferred first device profile and the transferred authentication credential.

In an embodiment, the first subscriber node device 112A may be configured to receive the transaction message from the broker node device 110. The first subscriber node device 112A may share the received transaction message with a first node (such as the first node 304A) of a distributed ledger (such as the distributed ledger 304) of the MaaS network 108. The first subscriber node device 112A may be associated with the first node 304A of the distributed ledger 304. In an embodiment, the first node 304A of the distributed ledger 304 may be configured to receive the shared transaction message and execute a transaction associated with the first transportation service based on information associated with the captured event in the received transaction message.

In an embodiment, the first publisher node device 104A may be associated with a plug-in module (e.g., the plug-in 622A) that may be configured to convert the transaction message from a message format associated with the first publisher node device 104A to a message format associated with the MaaS network 108.

In an embodiment, the first subscriber node device 112A may be associated with a node management device (e.g., the node management device 504) that may be configured to detect an operational failure associated with one or more of: a network failure of the first subscriber node device 112A, a power failure of the first subscriber node device 112A, or a fault caused by a malfunctioning component associated with the first subscriber node device 112A. The node management device 504 may be further configured to determine an operational state of the first subscriber node device 112A as an inactive state based on the detection.

The node management device 504 may be further configured to select and operationalize a backup subscriber node device 502A from a plurality of subscriber nodes 112B, . . . 112N of the MaaS network 302 as a replacement for the inactive first subscriber node device 112A. The node management device 504 may route the received transaction message to the selected backup subscriber node device 502A, which may temporarily store the routed transaction message. The node management device 504 may be further configured to initialize a recovery of the inactive subscriber node device 112A and after the recovery is complete, instruct the backup subscriber node device 502A to reroute the stored transaction message to the recovered subscriber node device 112A.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
a server; and
a publisher node device communicatively coupled to the server via a communication network, wherein the publisher node device is configured to:
  transmit a request comprising an authentication credential associated with the publisher node device to the server;
  receive a response to the transmitted request from the server, the response comprising authentication of the publisher node device as a ticket processing client for a transportation service;
  capture, as the ticket processing client, an event associated with the transportation service based on the received response, wherein the event associated with the transportation service includes at least one of an issuance of an electronic ticket for the transportation service, recharge of the electronic ticket for the transportation service, or scan of the electronic ticket for the transportation service; and
  transmit, based on the captured event, a transaction request to a broker node device of a Mobility-as-a-Service (MaaS) network associated with a publish-subscribe pattern, the transaction request comprising a transaction message and an authorization request to route the transaction message to a subscriber node device of the MaaS network, wherein the authorization request includes a first device profile associated with the publisher node device and the authentication credential associated with the publisher node device,
wherein the server is configured to:
  receive the authorization request from the broker node device;
  compare the received first device profile associated with the publisher node device with one or more profiles of valid transportation providers;
  compare the received authentication credential associated with the publisher node device with a stored authentication credentials; and
  authorize the broker node device to route the transaction message based on a result of the comparison of the received first device profile associated with the publisher node device with the one or more profiles of valid transportation providers and the comparison of the received authorization credential associated with the publisher node device with the stored authentication credentials.

2. The system according to claim 1, wherein the server is further configured to:
receive, from the publisher node device, the request comprising the authentication credential associated with the publisher node device;
authenticate the publisher node device based on the authentication credential associated with the publisher node device; and
transmit, to the publisher node device, the response for the received request based on the authentication of the publisher node device.

3. The system according to claim 1, wherein the broker node device is further configured to transmit the transaction message to the server along with the first device profile and the authentication credential in the authorization request, wherein
the server is further configured to:
authenticate the transaction message as a valid message from the publisher node device based on the first device profile; and
authorize the broker node device further based on the validation of transaction message.

4. The system according to claim 1, wherein the first device profile comprises at least one of a company name, a company identifier (ID), a station name, a station ID, a gate name, a gate ID, a geography, a region, or an address associated with the publisher node device.

5. The system according to claim 1, wherein the authentication credential comprises at least one of a device identifier (ID), a network ID, or a client certificate associated with the publisher node device.

6. The system according to claim 1, wherein the publisher node device is further configured to:
receive a user input comprising a selection of an authentication option as one of a network-based authentication option or a certificate-based authentication option; and
select the authentication credential based on the selected authentication option in the received user input.

7. The system according to claim 1, wherein the publisher node device is further configured to:
read the electronic ticket issued to a user for the transportation service; and
capture the event based on the reading of the electronic ticket.

8. The system according to claim 1, wherein the publisher node device is associated with a node management device for a first transportation provider of the transportation service.

9. The system according to claim 8, wherein the node management device is configured to:
transfer a second device profile associated with a second transportation provider to the publisher node device;
replace, on the publisher node device, a first device profile associated with the first transportation provider with the transferred second device profile; and
operationalize the publisher node device as the ticket processing client associated with the second transportation provider based on the replacement.

10. The system according to claim 8, wherein the node management device is configured to:
detect an operational failure associated with at least one of an authentication failure of the publisher node device, a network failure of the publisher node device, a power failure of the publisher node device, or a fault caused by a malfunctioning component associated with the publisher node device; and
determine an operational state of the publisher node device as an inactive state based on the detection.

11. The system according to claim 10, wherein the node management device is further configured to:
transfer the authentication credential and a first device profile associated with the publisher node device to a backup publisher node device based on a determination that determined operational state is the inactive state; and
operationalize the backup publisher node device as a replacement for the publisher node device based on the transferred first device profile and the transferred authentication credential.

12. The system according to claim 1, wherein the subscriber node device is configured to:
receive the transaction message from the broker node device; and
share the received transaction message with a first node of a distributed ledger of the MaaS network, wherein the subscriber node device is associated with the first node of the distributed ledger.

13. The system according to claim 12, wherein the first node of the distributed ledger is configured to:
receive the shared transaction message; and
execute a transaction associated with the transportation service based on information associated with the captured event in the received transaction message.

14. The system according to claim 1, wherein the publisher node device is associated with a plug-in module configured to convert the transaction message from a message format associated with the publisher node device to a message format associated with the MaaS network.

15. The system according to claim 1, wherein the subscriber node device is associated with a node management device, the node management device is configured to:
detect an operational failure associated with at least one of a network failure of the subscriber node device, a power failure of the subscriber node device, or a fault caused by a malfunctioning component associated with the subscriber node device; and
determine an operational state of the subscriber node device as an inactive state based on the detection.

16. The system according to claim 15, wherein the node management device is further configured to:
operationalize a backup subscriber node device of a plurality of subscriber nodes of the MaaS network as a replacement for the subscriber node device in the inactive state; and
route, based on the operationalization, the received transaction message to the backup subscriber node device which temporarily stores the routed transaction message.

17. The system according to claim 16, wherein the node management device is further configured to:
initialize a recovery of the subscriber node device; and
instruct, after the recovery is complete, the backup subscriber node device to reroute the stored transaction message to the subscriber node device.

18. A method, comprising:
transmitting, by a publisher node device, a request comprising an authentication credential associated with the publisher node device to a server, wherein the publisher node device is communicatively coupled to the server via a communication network;
receiving, by the publisher node device, a response to the transmitted request from the server, the response comprising authentication of the publisher node device as a ticket processing client for a transportation service;

capturing, by the publisher node device as the ticket processing client, an event associated with the transportation service based on the received response, wherein the event associated with the transportation service includes at least one of an issuance of an electronic ticket for the transportation service, recharge of the electronic ticket for the transportation service, or scan of the electronic ticket for the transportation service;

transmitting, by publisher node device, a transaction request to a broker node device of a Mobility-as-a-Service (MaaS) network associated with a publish-subscribe pattern, based on the captured event,
the transaction request comprising a transaction message and an authorization request to route the transaction message to a subscriber node device of the MaaS network, wherein the authorization request includes a device profile associated with the publisher node device and the authentication credential associated with the publisher node device;

receiving, by the server, the authorization request from the broker node device;

comparing, by the server, the received device profile associated with the publisher node device with one or more profiles of valid transportation providers;

comparing, by the server, the received authentication credential associated with the publisher node device with a stored authentication credentials; and authorizing, by the server, the broker node device to route the transaction message based on a result of the comparison of the received device profile associated with the publisher node device with the one or more profiles of valid transportation providers and the comparison of the received authorization credential associated with the publisher node device with the stored authentication credentials.

* * * * *